INVENTOR.
William B. Jeffrey
BY
A. A. Steinmiller
Attorney

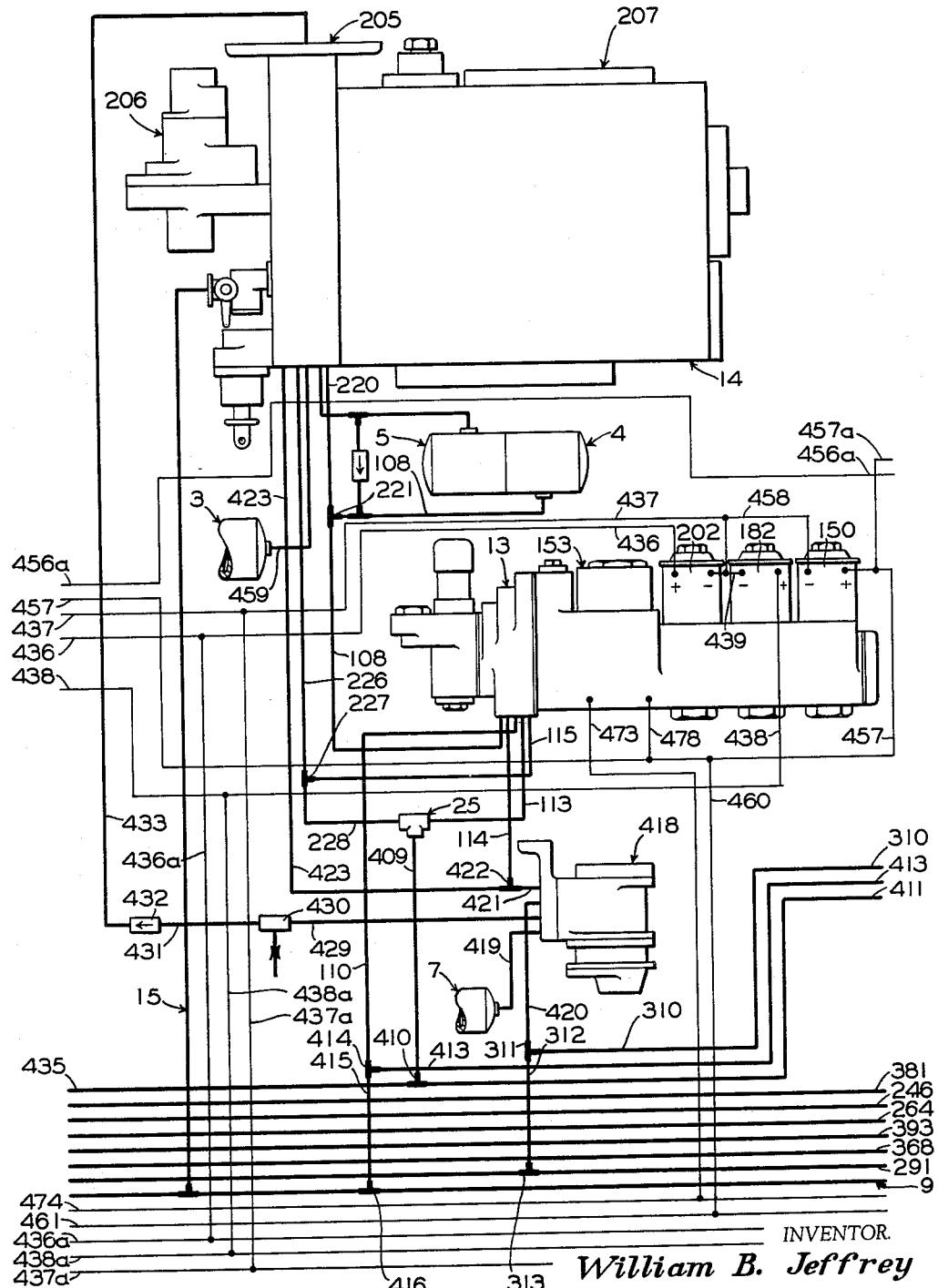

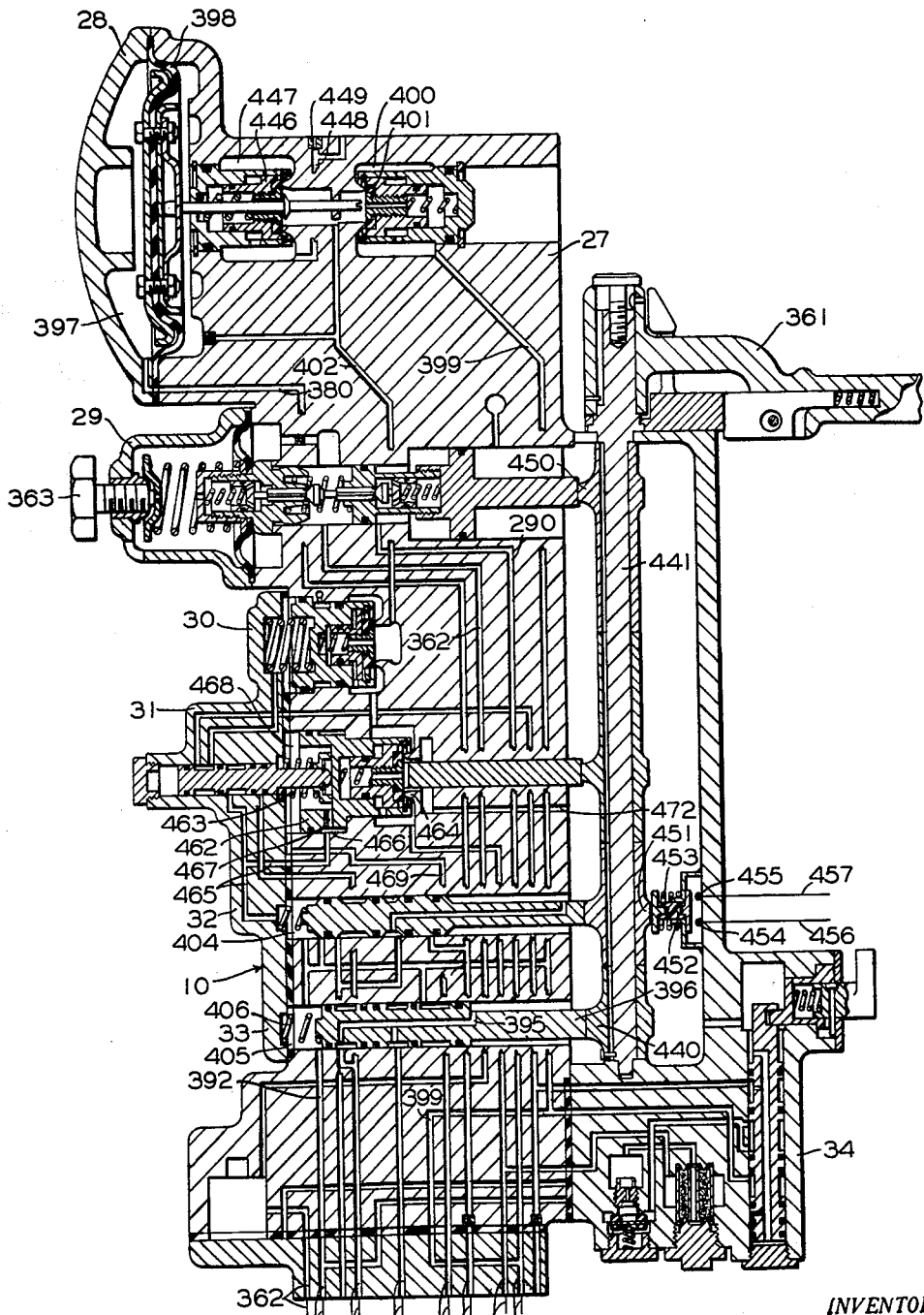

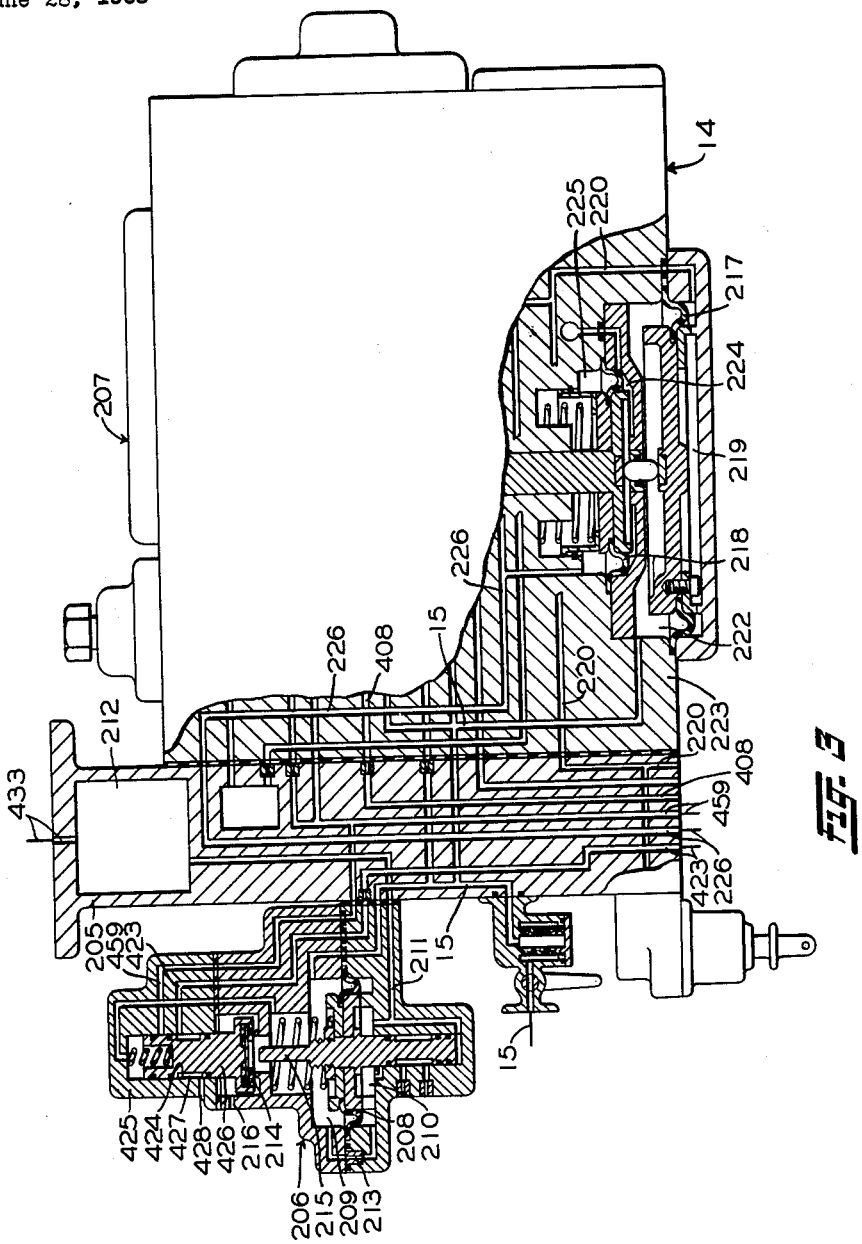

United States Patent Office 3,260,553
Patented July 12, 1966

3,260,553
ELECTRO-PNEUMATIC BRAKE CONTROL
APPARATUS
William B. Jeffrey, Irwin, Pa., assignor to Westinghouse
Air Brake Company, Wilmerding, Pa., a corporation of
Pennsylvania
Filed June 28, 1963, Ser. No. 291,570
12 Claims. (Cl. 303—16)

This invention relates to brake control apparatus for railway vehicles, and more particularly to a combined electro-pneumatic and automatic-pneumatic brake control apparatus for controlling brakes on a railway locomotive and a train of coupled cars on the electro-pneumatic straight-air principle according to energization and de-energization of application and release train wires, or on the automatic pneumatic principle according to the extent of reduction in pressure of fluid in a brake pipe on the train in the event of a short circuit or malfunction of the train wires from any cause.

Certain railroads in the United States now have in use on their properties various existing types of combined electro-pneumatic straight air and automatic-pneumatic brake equipments, such as those using the well-known "D-22" type or "U" type of control valve device.

Accordingly, it is the general object of this invention to provide a combined electro-pneumatic and automatic-pneumatic brake control apparatus for a railway locomotive or self-propelled passenger car that will operate compatibly in a mixed train wherein certain of the cars are provided with a brake equipment including either a "D-22" type or "U" type of control valve device.

A more specific object of the invention is to provide a dual type of brake control system for a railway locomotive or self-propelled passenger car comprising an electro-pneumatic brake apparatus and an automatic-pneumatic brake apparatus so constructed and coordinated that, upon failure of the electro-pneumatic brake apparatus to effect a brake application on all the cars in a mixed train, the automatic-pneumatic brake apparatus will function automatically to effect a brake application on all the cars in the mixed train without the necessity for the engineer to operate any change-over mechanism or perform any act whatsoever.

The present invention comprises an electro-pneumatic straight-air brake apparatus embodying a magnet valve device operated through train wires by a pneumatically operated master controller the operation of which is effected by manual operation of an engineer's brake valve device, and an automatic-pneumatic brake apparatus embodying a fluid pressure operated control valve device that is also controlled by manual operation of the engineers' brake valve device.

Operation of the above-mentioned magnet valve device is effective to cause the supply of fluid under pressure from a control reservoir associated with the above-mentioned fluid pressure operated control valve device to a relay valve device the operation of which effects the supply of fluid under pressure to brake cylinders to cause a brake application on the vehicle. The resulting reduction of control reservoir pressure in a chamber at one side of a movable abutment in the control valve device is accompanied by a simultaneous reduction of brake pipe pressure active in a chamber at the opposite side of the movable abutment in response to manual operation of the engineer's brake valve device to effect a corresponding reduction in pressure in a brake pipe, thereby rendering the control valve device inoperative. Therefore, should the magnet valve device for any reason become inoperative to effect a reduction of the pressure in the control reservoir, as brake pipe pressure is correspondingly reduced by manual operation of the engineer's brake valve device, the higher pressure remaining in the control reservoir effects an immediate automatic operation of the control valve device to cause a pneumatic brake application independently of and without the necessity of any action by the engineer.

In the accompanying drawings:

FIG. 1, FIG. 1A, FIG. 1B and FIG. 1C, when taken together such that the right-hand edge of FIG. 1 is matched with the left-hand edge of FIG. 1A, the right-hand edge of FIG. 1A is matched with the left-hand edge of FIG. 1B, and the right-hand edge of FIG. 1B is matched with the left-hand edge of FIG. 1C, constitute a diagrammatic view of a combined electro-pneumatic and automatic-pneumatic locomotive brake apparatus embodying the invention.

FIG. 2 is a diagrammatic cross-sectional view, showing details of the brake valve device shown in outline in FIGS. 1 and 1C.

FIG. 3 is a partial diagrammatic sectional view of a fluid pressure operated control valve device shown in outline in FIG. 1B.

Description

Figure 1:
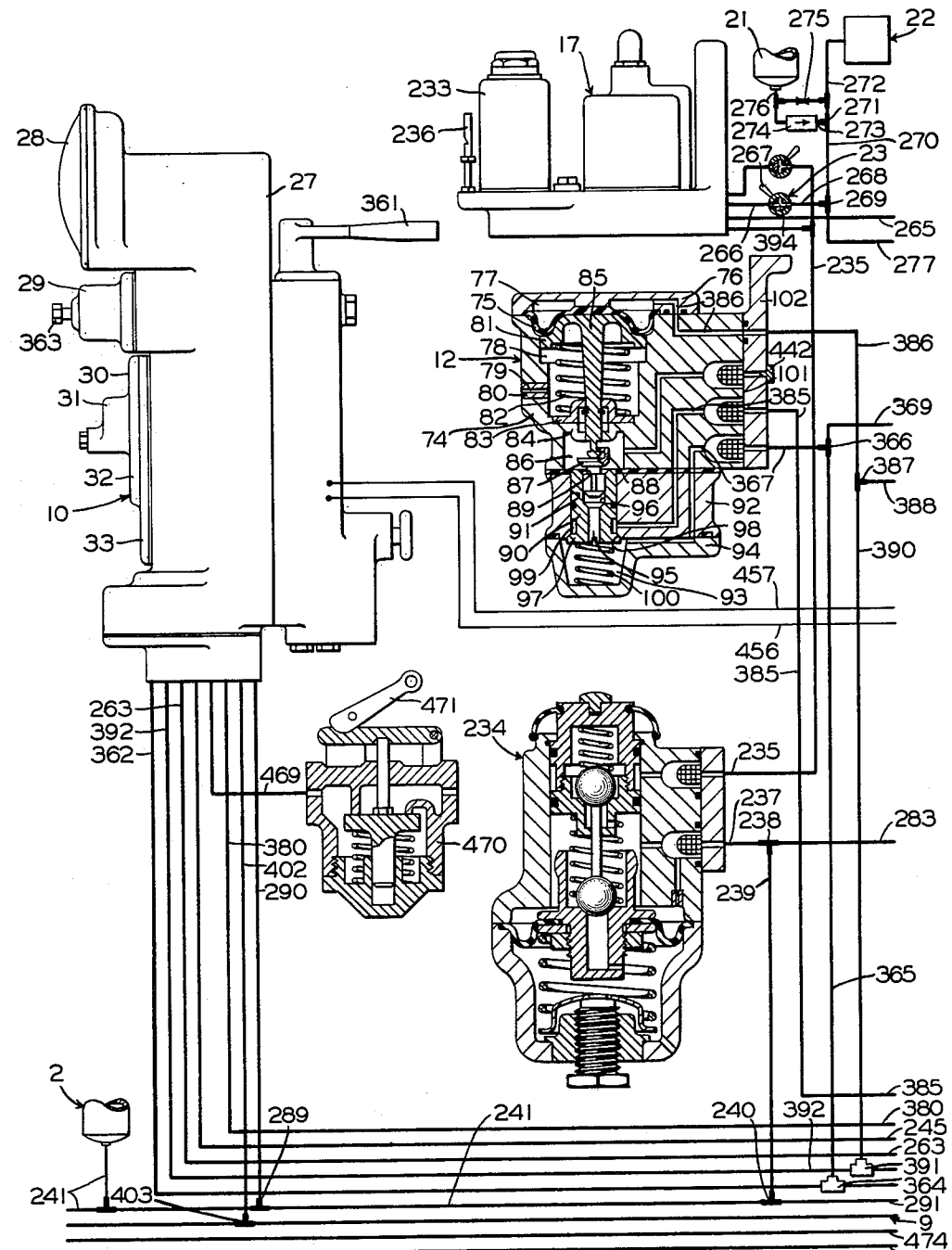

Referring to FIGS. 1, 1A, 1B and 1C of the drawings, the combined electro-pneumatic ad automatic-pneumatic brake apparatus for use on a diesel or diesel-electric type of railway locomotive or on a self-propelled passenger car comprises a brake cylinder device 1, a plurality of reservoirs including a main reservoir 2, an auxiliary reservoir 3, a control reservoir 4 which is combined with a selector volume reservoir 5 into a two-compartment reservoir and three volume reservoirs 6, 7 and 8, a brake pipe 9 that extends from end to end of the locomotive or self-propelled passenger car, two identical engineer's brake valve devices 10, one located at each end of a double-end type of locomotive or self-propelled passenger car, each operative to control the pressure in the brake pipe 9, a master controller device 11 for controlling the energization and deenergization of application and release train wires extending through the cars in a train, a cut-off valve device 12 through which the supply of fluid under pressure from one or the other of the brake valve devices 10 to the master controller device 11 is effected while the pressure in the main reservoir 2 is in excess of a chosen pressure in a manner hereinafter explained, a magnet valve device 13 the operation of which is under the control of the master controller device 11, and a fluid pressure brake control valve device 14 that is connected by a branch pipe 15 to the brake pipe 9.

Additional components of the combined electro-pneumatic and automatic-pneumatic brake apparatus mentioned above include, for effecting a brake application upon the occurrence of an adverse signal indication, a brake application valve device 16, a train control or timing valve device 17, a suppression valve device 18 to which is connected a pneumatic switch device 19 that controls the circuit to a suppression indicator light in the engineer's cab and a stop reservoir 20, a timing reservoir 21, a power cut-off switch device 22, and a normally open, manually operated cut-out valve device 23 operative to a closed position to cut out train control when the locomotive or self-propelled passenger car is not the leading unit in multiple-unit locomotive or multiple-car operation.

The combined electro-pneumatic and automatic-pneumatic brake apparatus of the present invention also comprises a fluid pressure operated relay valve device 24 for effecting the supply of fluid under pressure from the main reservoir 2 to the brake cylinder device 1 in response to the supply of fluid under pressure thereto via a double check valve device 25 by operation of either the magnet valve device 13 or the brake control valve device 14 in a manner hereinafter explained in detail and a dynamic brake interlock valve device 26.

The engineer's brake valve device 10 is diagrammatically shown in FIG. 2 of the drawings and may be of the self-lapping type, such as that disclosed in United States Patent No. 2,958,561, issued November 1, 1960, to Harry C. May, and assigned to the assignee of the present application, and, in view of this, it is deemed unnecessary to show and describe this device in detail. Briefly, however, the engineer's brake valve device comprises a sectionalized casing 27 containing a relay valve device 28, a self-lapping regulating or control valve device 29, a brake pipe cut-off valve device 30, a vent valve device 31, an emergency valve device 32, a suppression valve device 33, and a manually positionable selector valve device 34 for selectively conditioning the brake valve device 10 to operate the brake apparatus when the brake valve device 10 is located on the leading locomotive of a multi-unit locomotive, or to cut out control of brake pipe pressure by the brake valve device 10 when the locomotive is a trailing unit in a multiple-unit locomotive, or for conducting a brake pipe leakage test.

Figure 1A:
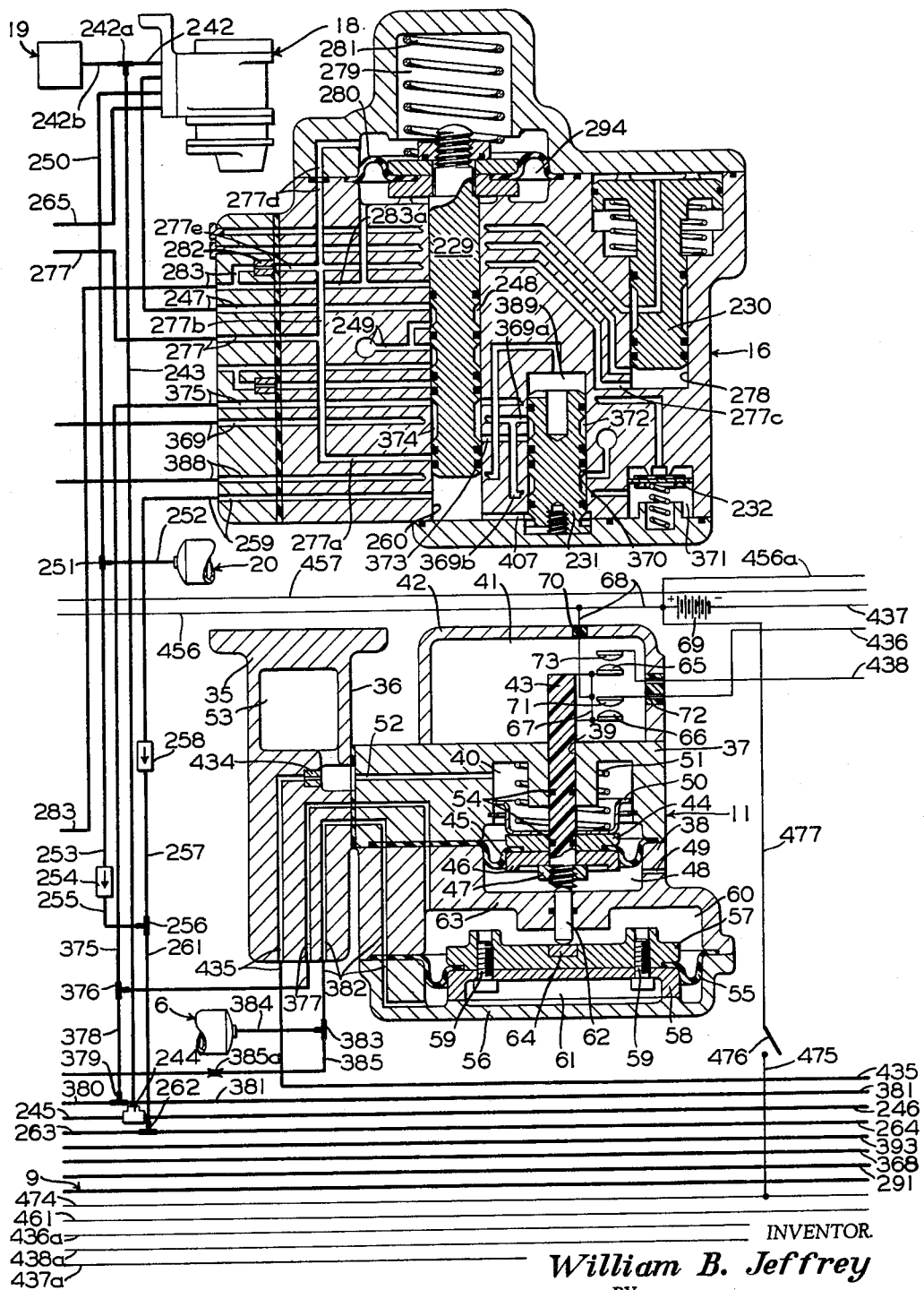

The master controller device 11 comprises a pipe bracket 35 that is provided on its right-hand side, as viewed in FIG. 1A, with a vertical bolting face 36 to which is secured by any suitable means (not shown) a sectionalized casing comprising two casing sections 37 and 38.

The casing section 37 is provided with a bore 39 which opens at one end into a chamber 40 adjacent the end of the casing section 37 to which the casing section 38 is secured and opens at the other end into an atmospheric chamber 41 adjacent the other end of the casing section 37 to which a cover member 42 is secured by any suitable means (not shown). Slidably mounted in the bore 39 is a stem 43 constructed of some suitable insulating material, such as, for example, plastic. Secured by any suitable means (not shown) to that portion of the stem 43 that extends into the chamber 40 is a diaphragm follower 44 that is operatively connected to the center of a diaphragm or movable abutment 45 by means such as a diaphragm follower plate 46 and a nut 47 that has screw-threaded engagement with screw threads formed on the lower end of the stem 43 that passes through corresponding smooth bores in the diaphragm follower 44 and diaphragm follower plate 46. The outer periphery of the diaphragm 45 is clamped between the casing sections 37 and 38 by any suitable means (not shown) used to secure these casing sections together.

The diaphragm 45 cooperates with the casing sections 37 and 38 to form within the master controller device 11 and on opposite sides of the diaphragm the chamber 40 and a chamber 48 that is open to atmosphere through a port 49 formed in the casing section 38. Disposed within the chamber 40 between the casing section 37 and a hollow spring seat 50 and in surrounding relation to the stem 43 is a spring 51 for biasing the spring seat 50 against the diaphragm follower 44 and thereby biasing the stem 43 and the diaphragm 45 in a downward direction. The chamber 40 above the diaphragm 45 is connected by a passageway 52 formed in the casing section 37 to a volume chamber 53 formed in the pipe bracket 35.

The stem 43 is provided with two identical spaced-apart peripheral annular grooves in each of which is disposed an O-ring seal 54 to prevent leakage of fluid under pressure between the periphery of the stem 43 and the wall of bore 39 and between the chambers 40 and 48.

The master controller 11 comprises a second diaphragm 55 coaxial with the diaphragm 45 and having a greater effective area, the two diaphragms being connected, though not positively, to form a stack, as will be understood from subsequent description. The outer periphery of the larger diaphragm 55 is clamped between the lower end of the casing section 38 and a cover 56 which is secured to the casing section 38 by any suitable means (not shown). The center of the diaphragm 55 is clamped between two diaphragm followers 57 and 58 which are secured together by a plurality of cap screws 59 that pass through corresponding smooth bores in the diaphragm follower 58 and have screw-threaded engagement with coaxial threaded bores in the diaphragm follower 57.

The larger diaphragm 55 cooperates with the casing section 38 and the cover 56 to form within the master controller device 11 and on opposite sides of the diaphragm 55 a pair of chambers 60 and 61. A cylindrical pusher stem 62, arranged coaxially with the diaphragm 45 and 55, has sealing, slidably guided contact with the wall of an aligned bore through a casing partition 63 separating the chamber 60 from the chamber 48, the ends of the pusher stem 62 abuttingly contacting, respectively, the lower end of the stem 43 and a wear plate 64 that is carried in the upper face of the diaphragm follower 57.

Carried by the stem 43 in spaced-apart insulated relationship within the chamber 41 in the master controller 11 are a pair of movable electrical contacts 65 and 66 which are connected together by a wire 67 that, in turn, is connected by a wire 68 to the positive terminal of a battery 69, the wire 68 extending through a bushing 70 constructed of some suitable insulating material, such as, for example, plastic, and carried by the cover member 42.

Disposed within the chamber 41 and between the movable electrical contacts 65 and 66 so as to be in the path of movement of the movable contact 66 is a release contact 71 that is anchored in a bushing 72 constructed of some suitable insulating material, such as, for example, plastic, and carried by the cover member 42. Also disposed within the chamber 41 so as to be in the path of movement of the movable contact 65 is an application contact 73 that likewise is anchored in the bushing 72. The release contact 71 and application contact 73 are connected to the magnet valve device 13 in a manner hereinafter described.

Cut-off valve device 12 comprises a casing section 74 containing a diaphragm 75 clamped about its periphery between the casing section 74 and a cover 76, and defining with the cover a control chamber 77. At the other side of the diaphragm 75 is a spring chamber 78 which is open to atmosphere through a passageway 79 formed in a bushing 80 that is press-fitted into a bore in the casing section 74. Contained in the chamber 78 is a diaphragm follower 81 which is biased into operative contact with the diaphragm 75 by a spring 82 interposed between the follower 81 and a hollow spring seat 83 that rests against a partition wall 84 of the chamber 78. Follower 81 has a stem 85 that extends through the hollow spring seat 83 and a central opening in the partition wall 84.

A chamber 86 is formed in the casing section 74 at the side of the partition wall 84 opposite the chamber 78 and contains a valve 87 that is linked by means of a forked connection 88 to the lower end of follower stem 85, as viewed in FIG. 1 of the drawings. The valve 87 is adapted to make seating contact with a valve seat 89 formed on the upper end of a cylindrical valve member 90 which is slidably mounted in a bore 91 formed in a casing section 92 which is secured to the casing section 74 by any suitable means (not shown). The bore 91 in the casing section 92 extends from the chamber 86 to a chamber 93 formed in another casing section 94 secured to the casing section 92 by any suitable means (not shown).

The valve member 90 is provided with a through bore 95 and a coaxial counterbore 96 encircled at its upper end by the valve seat 89. The lower end of the cylindrical valve member 90 is encircled by a conical or poppet-type valve 97, which valve is arranged for cooperation with a valve seat 98 formed on the casing section 92 at the lower end of bore 91, to control communication between chamber 93 and a chamber 99 defined by the wall of the bore 91 and a reduced portion of the valve member 90. A spring 100 is disposed in chamber 93 and is interposed between the valve 97 and the casing section 94 for urging the valve member 90 upwardly to a position in which communication between chambers 86 and 93 is open via bore 95 and counterbore 96, and communication between chamber 93 and chamber 99 is closed, as shown in FIG. 1 of the drawings.

The casing section 74 is provided with a vertical bolting face 101 whereby the cut-off valve device 12 can be secured to a pipe bracket 102 by any suitable means such as cap screws (not shown). The pipe bracket 102 can be secured to any suitable part of a locomotive or a self-propelled car.

Figure 4:
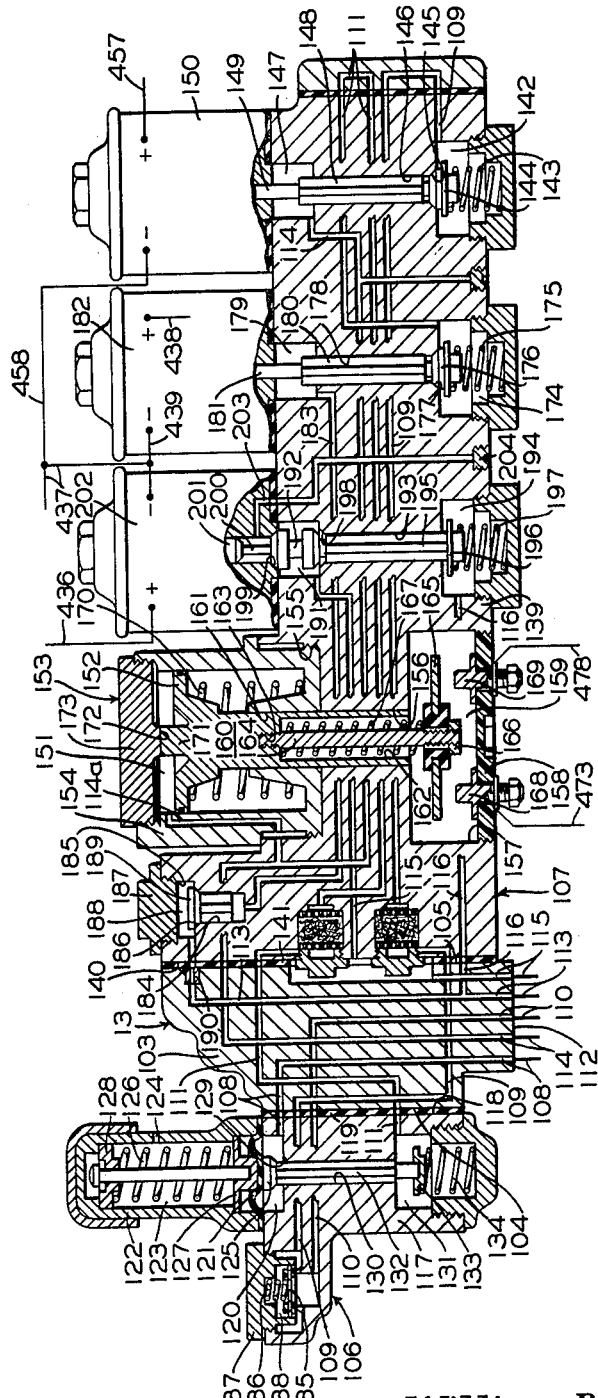
FIG. 4 is a diagrammatic sectional view of a magnet valve device shown in outline in FIG. 1B.

The magnet valve device 13 is shown diagrammatically in FIG. 4 of the drawings and comprises a pipe bracket 103 that is provided on opposite sides, respectively, with vertical bolting faces 104 and 105 to which are secured, respectively, by any suitable means (not shown) a cut-off valve device 106 and a magnet valve mechanism 107.

Extending from the vertical bolting face 104 through the pipe bracket 103 are four ports and passageways 108, 109, 110 and 111. The passageways 108 and 110 open at a flat surface 112 on the lower side of the pipe bracket 103, and the passageways 109 and 111 open at the surface of the vertical bolting face 105 of the pipe bracket. Also opening at the surface of the vertical bolting face 105 and extending therefrom through the pipe bracket 103 and opening at the flat surface 112 on the bracket are three other ports and passageways 113, 114 and 115. Still another port 116 opens at the surface of the vertical bolting face 105 and is connected by a corresponding passageway in the pipe bracket 103 to the passageway 113 in the pipe bracket, which passageway 113 is connected by a pipe bearing the same numeral to the right-hand end of the double check valve device 25, as shown in FIG. 1B.

The end of the passageway 115 that opens at the vertical bolting face 105 is enlarged, as shown in FIG. 3 of the drawings, to receive the ends of two pipe plugs carried by the magnet valve mechanism 107 hereinafter described.

The cut-off valve device 106 of the magnet valve device 13 comprises a body 117 that is provided on one side thereof with a vertical bolting face 118 that corresponds to the bolting face 104 of the pipe bracket 103, in that opening at the surface of the bolting face 118 are the same number of ports as open at the surface of the bolting face 104, these ports being identically arranged therein and opening from corresponding passageways in the body 117 so that when a gasket 119, provided with ports therein corresponding in number and arrangement to the ports opening at the respective surfaces of bolting faces 104 and 118, is placed between these two bolting faces, and the body 117 is rigidly secured to the pipe bracket 103 by bolts or other suitable means (not shown), the passageways 108, 109, 110 and 111 in the pipe bracket 103 extend into corresponding passageways in the body 117.

The passageway 108 extends through the body 117 to a chamber 120 formed in the body at the lower side of a diaphragm 121 which is rigidly clamped around its periphery between the body 117 and a hollow cylindrical cover 122 which is secured to the body 117 by any suitable means (not shown). The diaphragm 121 and cover 122 cooperate to form at the upper side of the diaphragm a chamber 123 that is open to atmosphere through a port 124 formed in the cover 122. The diaphragm 121 is operatively connected to a poppet-type cut-off valve 125 as will now be described.

A spring 126, disposed in the chamber 123 and interposed between a first follower 127 having contact with the upper side of the diaphragm 121 and a second follower 128 slidably mounted in the hollow cylindrical cover 122, biases the cut-off valve 125 towards a lower position against an annular valve seat 129 formed at the upper end of a bore 130 extending from the chamber 120 through the body 117 to a chamber 131 also in the body 117. The cut-off valve 125 has a fluted stem 132 integral therewith that extends through the bore 130 into the chamber 131 into which opens the hereinbefore-mentioned passageway 111. Disposed in the chamber 131 and in contact with the lower end of the fluted stem 132 is a spring seat 133 between which and the bottom of the chamber 131 is interposed a spring 134 which is effective to bias the fluted stem 132 and cut-off valve 125 upward against the bottom of the diaphragm 121. The strength of the spring 126 is substantially greater than the strength of the spring 134 so that the spring 134 is effective to unseat the cut-off valve 125 from its seat 129 only when the fluid pressure in the chamber 120 exceeds a chosen value which is sufficient to deflect the diaphragm 121 upward against the yielding resistance of the heavy spring 126. The passageway 108 extending through the body 117 and pipe bracket 103 is connected by a pipe bearing the same numeral, as shown in FIG. 1B of the drawings, to the control reservoir 4. Therefore, upon the pressure in the control reservoir 4 and chamber 120 being reduced below the above-mentioned chosen value as the result of leakage or any other cause, the heavy spring 126 will effect seating of the cut-off valve 125 on its corresponding annular valve seat 129 to retain sufficient pressure in the control reservoir 4 to effect an automatic-pneumatic brake application in a manner hereinafter described in detail.

The passageway 110 in the body 117 of the cut-off valve device 106 leads to the lower side of a preferably disc-shaped check valve 135 that is normally biased to a seated position by a spring 136. The spring 136 is disposed between the check valve 135 and a screw-threaded plug 137 having screw-threaded engagement with the body 117. The plug 137 cooperates with the body 117 to form a chamber 138 into which opens the passageway 109 in the body 117.

The magnet valve mechanism 107 of the magnet valve device 13 comprises a body 139 which, like the body 117, is provided on one side thereof with a vertical bolting face 140 that corresponds to the bolting face 105 of the pipe bracket 103, in that opening at the surface of the bolting face 140 are the same number of ports as open at the surface of the bolting face 105, these ports being identically arranged therein and opening from passageways in the body 139. Therefore, when a gasket 141 which is provided with ports therein corresponding in number and arrangement to the ports opening at the respective surfaces of bolting faces 105 and 140 is placed between these two bolting faces, and the body 139 is rigidly secured to the pipe bracket 103 by bolts or other suitable means (not shown), the hereinbefore-mentioned passageways 109, 111, 113, 114, 115 and 116 in the pipe bracket extend into the body 139.

The passageway 109 extends through the body 139 and opens into a chamber 142 formed in the body 139, in which chamber is disposed a spring 143 that is effective to normally bias a poppet-type emergency valve 144 against an annular valve seat 145 formed at the lower end of a bore 146 extending through the body 139 from the chamber 142 to a chamber 147 also formed in the body 139. The emergency valve 144 is provided with a fluted stem 148 integral therewith that extends through the bore 146 and into the chamber 147 where its upper end abuts the lower end of a plunger 149 of a solenoid 150 which, when energized via a circuit hereinafter described in detail, is effective to move its plunger 149 and thereby the fluted stem 148 downward to effect unseating of the emergency valve 144 to establish a communication between chamber 142 and chamber 147 into which opens the hereinbefore-mentioned passageway 114 that extends through the body 139 and pipe bracket 103.

A branch 114a of the passageway 114 in the body 139 leads to a chamber 151 above a switch piston 152 of an emergency pneumatic switch device 153 that constitutes a part of the magnet valve mechanism 107.

The emergency pneumatic switch device 153 comprises, in addition to the switch piston 152, a cup-shaped switch cylinder 154 in which the switch piston 152 is slidably mounted. The switch cylinder 154 is provided at one end with external screw threads which have screw-threaded engagement with corresponding internal screw threads formed on the wall of a counterbore 155 that is coaxial with a bore 156 extending from the end of the counterbore 155, through the body 139, and opening into a second coaxial counterbore 157 therein, the open end of which is provided with internal screw threads for receiving a screw-threaded plug 158 which, in cooperation with the wall and bottom of the counterbore 157, form a switch chamber 159.

The switch piston 152 has formed integral therewith a piston rod 160 that is slidably mounted in the bore 156 in body 139 and a coaxial bore 161 extending through the closed end of the cup-shaped switch cylinder 154. The piston rod 160 is provided with a counterbore 162 and a coaxial bottom bore 163 that is threaded internally to receive a screw-threaded end of a rod 164, the opposite screw-threaded free end of which is disposed in the switch chamber 159. This free end of the rod 164 extends through an aperture in an insulating bushing moulded integral with a movable contact 165 and carries a nut 166 against which the insulating bushing of the contact 165 is baised by a contact spring 167 that is disposed in surrounding relation to the rod 164 and interposed between the bushing of the contact 165 and a shoulder formed by the upper end of the counterbore 162 in the piston rod 160.

The movable contact 165 is normally biased out of contact with two spaced-apart and insulated switch terminals 168 and 169 by a spring 170 that is disposed in surrounding relation to the piston rod 160 and interposed between the closed end of the switch cylinder 154 and the switch piston 152. In this position of the switch piston 152 a boss 171 on the upper face thereof is biased against a stop 172 that is formed on a screw-threaded plug 173 that has screw-threaded engagement with internal screw threads formed in the open end of the cup-shaped switch cylinder 154.

The passageway 111 extends through the body 139 and opens into a chamber 174 formed in the body 139, in which chamber is disposed a spring 175 that is effective to normally bias a poppet-type service valve 176 against an annular valve seat 177 formed at the lower end of a bore 178 extending through the body 139 from the chamber 174 to a chamber 179 also formed in the body 139. The service valve 176 is provided with a fluted stem 180 integral therewith that extends through the bore 178 and into the chamber 179 where its upper end abuts the lower end of a plunger 181 of a solenoid 182 which, when energized via a circuit hereinafter described in detail, is effective to move its plunger 181 and thereby the fluted stem 180 downward to effect unseating of the service valve 176 to establish a communication between chamber 174 and chamber 179 into which opens one end of a passageway 183 formed in the body 139 of the magnet valve mechanism 107.

The passageway 183 extends through the body 139 and opens into the bottom of a counterbore 184 formed in the body. The counterbore 184 is coaxial with another counterbore 185 of larger diameter in the body 139 and has an annular valve seat 186 formed at its junction with the counterbore 185. The upper end of the counterbore 185 is screw-threaded to receive a screw threaded plug 187 that cooperates with the wall of the counterbore 185 to form a chamber 188 in which is disposed a poppet-type check valve 189 having a fluted stem integral therewith and extending into the counterbore 184. The check valve 189 provides for flow of fluid under pressure from the chamber 179 via the passageway 183 to the chamber 188 and is operative to prevent back flow from the chamber 188 to the chamber 179.

The passageway 113 extends through the body 139 and opens into the chamber 188, and that end of the passageway 113 in the pipe bracket 103 that opens at the surface of the bolting face 105 thereon is provided with a service choke 190 that controls or restricts the rate at which fluid under pressure can be supplied by the service valve 176 for effecting a service brake application in a manner hereinafter described.

The passageway 115 in the body 139 opens at one end at the surface of the bolting face 140 on the body 139 and at the opposite end into a chamber 191 formed in the body, in which chamber is disposed a double-beat poppet-type release valve 192. The chamber 191 is connected by a bore 193 in the body 139 to a chamber 194 also in the body and into which chamber opens the passageway 116. The double-beat release valve 192 has formed integral therewith and extending from one end thereof through the bore 193 into the chamber 194 a fluted stem 195. The fluted stem 195 adjacent its lower end is provided with a peripheral annular groove (not shown) in which is inserted a snap ring 196 that serves as a spring seat for a spring 197 that is interposed between the snap ring 196 and the bottom of the chamber 194. The spring 197 is normally effective to bias the double-beat release valve 192 out of seating contact with a first annular valve seat 198 formed at the upper end of the bore 193 and into seating contact with a second annular valve seat 199 that is coaxial with the first annular valve seat 198.

The double-beat release valve 192 has formed integral therewith a stem 200 that extends therefrom in a direction opposite the direction of the fluted stem 195 for abutting contact with the lower end of a plunger 201 of a solenoid 202 which, when energized via a circuit hereinafter described in detail, is effective to move its plunger 201 and thereby the stem 200 downward against the yielding resistance of spring 197 to move the double-beat release valve 192 out of seating contact with the upper annular valve seat 199 and into seating contact with the lower annular valve seat 198 to close communication between the chamber 194 and the chamber 191 which is connected to atmosphere via the brake control valve device 14 in a manner hereinafter described. While the double-beat release valve 192 is held in seating contact with the lower annular valve seat 198, a communication is established between the chamber 191 and a passageway 203 in the body 139, the end of which passageway is closed by a screw-threaded plug 204.

A partial diagrammatic view of the brake control valve device 14 is shown in FIG. 3 of the drawings. This brake control valve device 14 may be of the graduated release type, such as that disclosed in United States Patent No. 3,018,138, issued January 23, 1962, to Richard L. Wilson and William B. Jeffrey, and assigned to the assignee of the present application, and, in view of this, it is deemed unnecessary to show and describe the control valve device in detail. Briefly, however, the brake control valve device 14 comprises a pipe bracket 205, to the left-hand side of which is secured an emergency portion 206 and to the right-hand side of which is secured a service portion 207.

Briefly, the emergency portion 206 comprises a diaphragm 208 having at one side a chamber 209 that is open to the brake pipe branch pipe 15 and having at the opposite side a chamber 210 that is connected via a passageway 211 to a quick action chamber 212 in the pipe bracket 205, which chamber is charged from the chamber 209 via a quick action chamber charging choke 213.

Arranged coaxially with the diaphragm 208 is a preferably disc-shaped brake pipe vent valve 214 which is adapted to be unseated by a stem 215 operatively connected to the diaphragm 208 upon an emergency rate of reduction in brake pipe pressure present in the chamber 209 above the diaphragm, whereupon the fluid under pressure present in the chamber 209 is vented to atmosphere via a port 216 at a rapid rate to hasten the propagation of an emergency rate of reduction in brake pipe pressure from car to car through the train.

The service portion 207 of the brake control valve device 14 comprises a diaphragm stack including two movable abutments or diaphragms 217 and 218 of unequal effective areas. The larger diaphragm 217 has at its lower side a chamber 219 constantly open to the control reservoir 4 via a passageway and corresponding pipe 220 that is connected to one end of a pipe T 221 interposed in the pipe 108 between the magnet valve device 13 and the control reservoir 4. The diaphragm 217 has at its upper side a chamber 222 constantly supplied with fluid under pressure from the brake pipe 9 via the brake pipe branch pipe 15 and a corresponding passageway extending through the pipe bracket 205 and a casing section 223 of the service portion 207 of the brake control valve device 14.

The smaller diaphragm 218 has at its lower side a chamber 224 that is constantly open to atmosphere and at its upper side a chamber 225 that is connected by a passageway and corresponding pipe 226 to one end of a pipe T 227, as shown in FIG. 1B of the drawings. The other end of the pipe T 227 is connected by a pipe 228 to the left-hand end of the double check valve device 25 and the side outlet of the pipe T 227 is connected to the passageway 115 in the pipe bracket 103 of the magnet valve device 13 by a pipe bearing the same numeral.

The brake application valve device 16 may be substantially the same as that disclosed in United States Patent No. 2,982,583, issued May 2, 1961, to Harry C. May and assigned to the assignee of the present application, and, in view of this, it is deemed unnecessary to describe this device in detail. Briefly, however, the brake application valve device 16 comprises a sectionalized casing containing, in addition to an application valve 229 and a suppression valve 230 which is inoperative in the present brake equipment, a release control valve 231 and a check valve device 232.

The train control or timing valve device 17 may be such as that shown and described in Patent No. 2,322,042, issued June 15, 1943 to Glenn T. McClure, and assigned to the assignee of the present application, and, in view of this, it is deemed unnecessary to describe this device in detail. It will, of course, be understood from the above-mentioned patent that the timing valve device 17 comprises a magnet valve device 233 operating on a circuit adapted to be controlled by any suitable means (not shown) which are operative in response to favorable and unfavorable track signals and thereby the existing track conditions on a railroad. When the track signal is favorable, the magnet valve device 233 is adapted to be energized. Conversely, when the track is unfavorable, the magnet valve device is deenergized.

It should be further understood, as explained in detail in the hereinbefore-mentioned Patent No. 2,322,042, that the magnet valve device 233 is operative to effect the supply of fluid under pressure at a constant reduced pressure from the outlet of a pressure reducing valve device 234, which is connected to the magnet valve device 233 of the train control or timing valve device 17 via a pipe 235 to a piston chamber (not shown) within the timing valve device 17 and to the timing reservoir 21, and the release of fluid under pressure from this chamber and reservoir to atmosphere through a fluid under pressure operated whistle 236 adapted to produce a sound upon a flow of fluid under pressure therethrough.

An inlet of the pressure reducing valve device 234 is connected by a pipe 237 to one end of a pipe T 238, the side outlet of which is connected by a pipe 239 to the side outlet of another pipe T 240. One end of this pipe T 240 is connected by a pipe 241 to the main reservoir 2 which may be charged with fluid under pressure by the usual fluid compressors (not shown) which comprises a part of the fluid pressure locomotive brake equipment.

The suppression valve device 18, shown in outline in FIG. 1A of the drawing, is identical in construction to the hereinbefore-described fluid pressure operated cut-off valve device 12, shown in detail in FIG. 1. The diaphragm chamber of the suppression valve device 18 is connected by a pipe 242 to one end of a pipe T 242a the opposite end of which is connected by a pipe 242b to the pneumatic switch device 19. The side outlet of the pipe T 242a is connected by a pipe 243 to the side outlet of a double check valve device 244. One end of the double check valve device 244 is connected by a pipe 245 to a passageway bearing the same numeral in the sectionalized casing 27 (FIG. 2) of the engineer's brake valve device 10 shown in FIG. 1 of the drawings. The opposite end of the double check valve device 244 is connected by a pipe 246 to a corresponding passageway in the sectionalized casing 27 of the brake valve device 10 shown in FIG. 1C of the drawing. It is thus apparent that the suppression valve device 18 and pneumatic switch 19 can be controlled from either end of the locomotive or self-propelled passenger car.

The chamber beneath the diaphragm 75 of the suppression valve device 18 is connected by a pipe 247 to a corresponding passageway bearing the same numeral in the sectionalized casing of the brake application valve device 16 shown in FIG. 1A of the drawings. While the application valve 229 of the brake application valve device 16 occupies its normal position in which it is shown in FIG. 1A of the drawings, an elongated annular cavity 248 in the periphery of the application valve 229 connects the passageway and pipe 247 and the chamber 78 below the diaphragm 75 of the suppression valve device 18 to a vent port and passageway 249 in the brake application valve device 16.

The chamber 86 of the suppression valve device 18 is connected by a passageway and pipe 250 to one end of a pipe T 251 the side outlet of which is connected by a pipe 252 to the hereinbefore-mentioned stop reservoir 20. The other end of the pipe T 251 is connected by a pipe 253 to the inlet side of a check valve device 254 the outlet of which is connected by a pipe 255 to the side outlet of a pipe T 256. One end of the pipe T 256 is connected by a pipe 257 to the outlet of a second check valve device 258 the inlet of which is connected by a pipe 259 to a passageway bearing the same numeral in the sectionalized casing of the brake application valve device 16, which passageway opens at the surface of a bore 260 formed in the sectionalized casing of the brake application valve device 16 and in which bore 260 the application valve 229 is slidably mounted.

The other outlet of the pipe T 256 is connected by a pipe 261 to the side outlet of a pipe T 262.

Figure 1C:
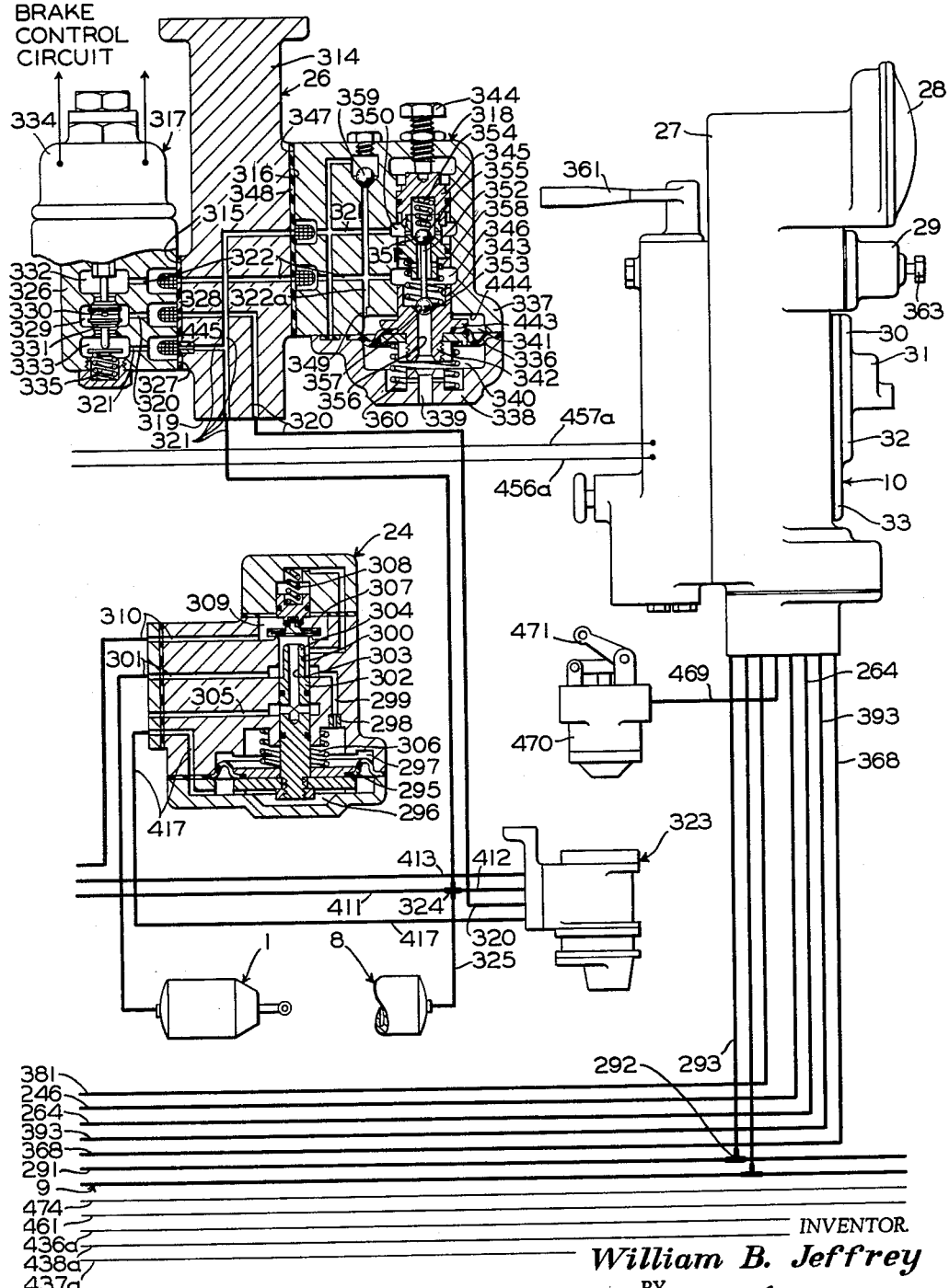

One end of the pipe T 262 is connected by a pipe 263 to a passageway bearing the same numeral (see FIG. 2) in the sectionalized casing 27 of the engineer's brake valve device 10 shown in FIG. 1 of the drawings, and the opposite end of the pipe T 262 is connected by a pipe 264 to the corresponding passageway in the engineer's brake valve device 10, shown in FIG. 1C and located at the opposite end of the locomotive or self-propelled passenger car. These passageways correspond to the passageway 208 of the engineer's brake valve device 1, shown in FIG. 1A of the hereinbefore-mentioned Patent No. 2,958,561.

The chamber 93 of the suppression valve device 18 is connected by a passageway and pipe 265 to a chamber (not shown) in the timing valve device 17. Disposed in this chamber is a double-beat valve (not shown) which corresponds to the double-beat valve 96 of the timing valve device 2, shown in FIG. 1A of the hereinbefore-mentioned Patent No. 2,322,042.

Upon deenergization of the magnet valve device 233 of the timing valve device 17 in response to an unfavorable traffic condition, the above-mentioned double-beat valve of the timing valve device 17 is operated from an upper seated position to a lower seated position, as explained in detail in the above-mentioned Patent No. 2,322,042.

With the double-beat valve in its lower position, a communication is established between the passageway and pipe 265 and a passageway and pipe 266 that is connected to one side of the hereinbefore-mentioned manually operated cut-out valve device 23. While a handle 267 of the cut-out valve device 23 occupies an open position in which it is shown in FIG. 1 of the drawings, the cut-out valve device 23 establishes a communication between the pipe 266 and a pipe 268 that is connected to the side outlet of a pipe T 269.

One end of the pipe T 269 is connected by a pipe 270 to one end of a pipe T 271 the opposite end of which is connected by a pipe 272 to the hereinbefore-mentioned power cut-off switch device 22. The side outlet of the pipe T 271 is connected by a pipe 273 to the outlet connection of a check valve device 274 having arranged in parallel therewith a choke 275. The inlet connection of the check valve device 274 is connected by a pipe 276 to the hereinbefore-mentioned timing reservoir 21 which is of a chosen capacity. The other outlet of the pipe T 269 is connected by a pipe 277 to a passageway bearing the same numeral in the sectionalized casing of the brake application valve device 16.

The passageway 277 in the sectionalized casing of the brake application valve device 16 has therein two branch passageways 277a and 277b. The branch passageway 277a opens at the surface of the bore 260 in the sectionalized casing of the brake application valve device 16 at a point spaced above the location at which the pipe and passageway 259 open at the surface of the bore 260. The branch passageway 277b has three branch passageways 277c, 277d and 277e.

The branch passageway 277c extends through the sectionalized casing and opens at the surface of a counterbore 278 therein adjacent the lower end thereof.

The branch passageway 277d extends through the sectionalized casing and opens into a chamber 279 at the upper side of a diaphragm 280 operably connected to the application valve 229. In addition to fluid under pressure that may be supplied to the chamber 279 at the upper side of the diaphragm 280, this side of the diaphragm is also subject to the force of a heavy spring 281 disposed in the chamber 279.

The branch passageway 277e is constantly open via a choke 282 to a pipe and passageway 283 which is connected to the right-hand side outlet of the pipe T 238. As hereinbefore mentioned, the side outlet of the pipe T 238 is connected via pipe 239, pipe T 240 and pipe 241 to the main reservoir 2. The pipe 241 has disposed therein a pipe T 289 the side outlet of which is connected by a pipe 290 to a passageway bearing the same numeral in the sectionalized casing 27 of the engineer's brake valve device 10 shown in FIG. 1 of the drawing. This passageway corresponds to the passageway 40 of the engineer's brake valve device 1 shown in FIG. 1A of the hereinbefore-mentioned Patent No. 2,958,561. As shown in the drawings, the right-hand end of the pipe T 240 shown in FIG. 1 of the drawings is connected by a pipe 291 to the left-hand end of a pipe T 292 shown in FIG. 1C of the drawings. The side outlet of the pipe T 292 is connected by a pipe 293 to the passageway in the brake valve device 10 shown in FIG. 1C corresponding to the passageway 290 shown in FIG. 2.

The passageway 283 in the sectionalized casing of the brake application valve device 16 has a branch pasasgeway 283a which, in turn, has two branch passageways one of which opens at the surface of the bore 260 at a point spaced above the location at which the passageway 247 opens at the surface of this bore, and the other of which opens into a chamber 294 at the lower side of the diaphragm 280.

The fluid pressure operated relay valve device 24 is shown diagrammatically in FIG. 1C of the drawings and may be of the self-lapping type, as is the brake cylinder release valve device 11 disclosed and described in the hereinbefore-mentioned United States Patent No. 2,958,561, and in view of this it is deemed unnecessary to describe this fluid pressure operated relay valve device in detail. Briefly, however, the fluid pressure operated relay valve device 24 comprises a diaphragm 295 subject opposingly to fluid pressures in a chamber 296 and in a chamber 297 that is open via a choke 298 and passageway 299 that opens at the wall surface of a bore 300 in a sectionalized casing of the fluid pressure operated relay valve device 24. Also opening at the wall surface of the bore 300 and directly opposite the location at which the passageway 299 opens into this bore is a passageway 301 which is connected by a pipe bearing the same numeral to the brake cylinder device 1. Slidably mounted in the bore 300 and coaxially connected to the chamber 297 side of the diaphragm 295 is one end of a valve stem 302 that is provided with a counterbore 303, the upper end of which provides an exhaust valve 304. The counterbore 303 is connected by cross bores that open at the periphery of the valve stem 302 which, while the valve stem 302 occupies the position shown in FIG. 1C of the drawings, register with an exhaust passageway 305 that opens through the sectionalized casing to the atmosphere. When fluid under pressure in chamber 296 exceeds that in chamber 297, the diaphragm 295 will shift upward against the resistance of a light bias spring 306 disposed in the chamber 297 and encircling the valve stem 302 for successively seating the exhaust valve 304 against a disc-type supply valve 307 and then operatively unseating the latter against the force of a light bias spring 308. The supply valve 307 is disposed in the chamber 309 which is connected by a passageway and corresponding pipe 310 to the side outlet of a pipe T 311. One end of the pipe T 311 is connected by a pipe 312 to the side outlet of a pipe T 313 that is disposed in the pipe 291. Therefore, fluid under pressure is supplied from the main reservoir 2 via pipe 241, pipe T 240, pipe 291, pipe T 313, pipe 312, pipe T 311, and pipe and passageway 310 to the chamber 309 of the fluid pressure operated relay valve device 24. With supply valve 307 unseated, fluid under pressure from the main reservoir 2 will flow to chamber 309 through the path just traced and thence from the chamber 309 via the bore 300 and passageway and pipe 301 to the brake cylinder device 1 and also via passageway 299 and choke 298 to the chamber 297 until the pressure in the chamber 297, together with the force of the spring 306, is increased to substantially the force provided by the fluid under pressure present in chamber 296, whereupon the diaphragm 295 will be shifted downward by the spring 306 to a lap position in which the supply valve 307 is reseated by the spring 308 and the exhaust valve 304 is maintained seated against the flat-disc supply valve 307 for thereby retaining in the brake cylinder device 1 a pressure substantially equal to that provided in the chamber 296. Whenever the pressure in the chamber 296 is reduced, the diaphragm 295 will be moved downward by the spring 306 to a release position in which it is shown in FIG. 1C of the drawings and in which exhaust valve 304 is unseated from the then seated supply valve 307 for thereby releasing fluid under pressure from the brake cylinder device 1 and the chamber 297 until the pressure in the chamber 297 is reduced to the pressure existing in the chamber 296. A slight further reduction in the pressure in the chamber 297 will cause the pressure in the chamber 296 to move the diaphragm 295 and the valve stem 302 upward until the exhaust valve 304 moves into contact with the lower side of the valve 307 which constitutes a lap position for the relay valve device 24. Thus relay valve device 24 operates to provide a brake cylinder pressure which is substantially equal to the pressure of fluid supplied to the chamber 296 in a manner hereinafter described in detail.

The dynamic interlock valve device 26 shown in FIG. 1C of the drawings comprises a pipe bracket 314 that is provided on opposite sides with vertical bolting faces 315 and 316 to which are secured, respectively, by any suitable means (not shown) a lockout magnet valve device 317 and an inshot valve device 318.

Extending from the vertical bolting face 315 of the pipe bracket 314 through the bracket and opening at a flat surface 319 on the lower side of the bracket and at right angles to the bolting faces 315 and 316 are two ports and passageways 320 and 321. The passageway 321 has a branch passageway extending through the pipe bracket 314 and opening at the surface of the bolting face 316. Extending through the pipe bracket 314 and opening respectively at the vertical bolting faces 315 and 316 is a passageway 322.

The port and passageway 320 in the pipe bracket 314 is connected by a pipe bearing the same numeral to a passageway (not shown) in an emergency valve device 323, shown in outline in FIG. 1C of the drawings, which valve device is identical in construction to the hereinbefore-described fluid pressure operated cut-off valve device 12 shown in FIG. 1. This passageway opens into the chamber 99 of the emergency valve device 323.

The port and passageway 321 in the pipe bracket 314 is connected by a pipe bearing the same numeral to one outlet of a pipe cross 324, the opposite outlet of which is connected by a pipe 325 to the hereinbefore-mentioned volume reservoir 8.

The lockout magnet valve device 317 comprises a casing or body 326 that is provided on one side thereof with a vertical bolting face 327 that corresponds to the bolting face 315 of the pipe bracket 314 in that opening at the surface of the bolting face 327 are the same number of ports as open at the surface of the bolting face 315, these ports being identically arranged therein and opening from corresponding passageways in the body 326 so that when a gasket 328, provided with ports therein corresponding in number and arrangement of the ports opening at the respective surfaces of bolting faces 315 and 327, is placed between these two bolting faces and the body 326 is rigidly secured to the pipe bracket 314 by bolts or other suitable means (not shown), the passageways 320, 321 and 322 in the pipe bracket 314 extend into corresponding passageways in the body 326.

The pasageway 320 extends through the body 326 to a chamber 329 in the body, which chamber contains two oppositely seating poppet valves 330 and 331 which are coaxially aligned and arranged for movement in unison. The valve 330 is arranged to control communication between chamber 329 and a chamber 332 into which opens the passageway 322 in the body 326, while the valve 331 is arranged to control communication between chamber 329 and a chamber 333 into which opens the passageway 321. The lockout magnet valve device 317 further comprises a magnet or solenoid 334 operative upon energization to open the valve 330 and to close the valve 331 and a spring 335 for opening valve 331 and closing valve 330 upon deenergization of magnet 334.

The magnet 334 is energized whenever a dynamic brake controller handle (not shown) is moved to a position to effect an application of the dynamic brakes and deenergized when the dynamic braking current fades below a chosen value as a result of a reduction of the speed of the train.

The inshot valve device 318 is of the self-lapping type and comprises a diaphragm 336 clamped around its outer edge between a casing 337 and a cover 338 having an atmospheric port 339 and subject on its lower side to atmospheric pressure in a chamber 340 which is open to atmosphere through the port 339. At the opposite side of the diaphragm is a chamber 341. Secured centrally to the diaphragm 336 is a plunger 342 that extends through the chamber 341 and into a bore 343 formed in the casing 337. Also slidably mounted in the bore 343 and adjustable to a chosen position therein by an adjusting screw 344 is a two-part plunger 345, the two plungers 342 and 345 cooperating with each other and with the casing 337 to form a chamber 346 between them.

The chamber 346 is open to a passageway in the casing 337, which passageway opens at the surface of a vertical bolting face 347 formed on the casing 337 and corresponding to the bolting face 316 of the pipe bracket 314, in that opening at the surface of the bolting face 347 are the same number of ports as open at the surface of the bolting face 316, these ports being identically arranged therein and opening from corresponding passageways in the body 337 so that when a gasket 348, provided with ports therein corresponding in number and arrangement to the ports opening at the respective surfaces of bolting faces 316 and 347, is placed between these two bolting faces and the casing 337 is rigidly secured to the pipe bracket 314 by bolts or other suitable means (not shown), the passageways 321 and 322 in the pipe bracket 314 extend into corresponding passageways in the body 337.

The chamber 346 is open to the chamber 341 via the passageway 322 and a branch passageway 322a in which is disposed a stabilizing choke 349.

Formed in the casing 337 and surrounding the plunger 345 is a chamber 350 into which opens the passageway 321. A ball-type supply valve 351 is arranged to control communication between the chamber 350 and the chamber 346 through an axial bore in the plunger 345, said valve 351 being mounted on one end of a stem 352 loosely extending through said bore into the chamber 346 wherein a ball-type release valve 353 is mounted on the other or lower end of the stem. A spring 354 interposed between the plunger 345 and the supply valve 351 acts on this valve for urging it to its seated or closed position against an annular valve seat 355 formed at the upper end of the bore in the plunger 345. The plunger 342 has an axial bore 356 open at one end to the atmospheric chamber 340 and open at the opposite end through an annular release valve seat 357 for the release valve 353 to the chamber 346. A light bias spring 358 contained in chamber 346 and acting oppositely on the plungers 342 and 345 is provided for maintaining the plunger 345 in contact with the adjusting screw 344.

The inshot valve device 318 further comprises a ball-type release check valve 359 so arranged in a communication connecting chamber 346 and passageway 322 to the passageway 321 as to permit flow of fluid under pressure from the former to the latter but to prevent reverse flow.

The adjusting screw 344 is regulated or adjusted to position the plunger 345 so that the supply valve 351 will be closed, as well as the release valve 353, when the diaphragm 336 assumes a position against a spring 360 that is heavier than the spring 358 and acts on the diaphragm with a chosen force corresponding to a certain pressure of fluid in chamber 341, such as ten pounds per square inch. With chamber 341 void of fluid under pressure the diaphragm 336 will be deflected by spring 360 to unseat the supply valve 351.

*Operation*

Assume initially that the brake equipment shown in FIGS. 1, 1A, 1B and 1C is the equipment on a locomotive that is hauling a train or on a self-propelled passenger car that is the leading or control car in a multi-car train; that the apparatus is void of fluid under pressure; that a handle 361 of the engineer's brake valve device 10 shown in FIG. 1 of the drawings is in "Release" position and that the corresponding handle 361 of the engineer's brake valve device 10 shown in FIG. 1C of the drawings is in "Handle Off" position so that the brakes on the train may be controlled by the engineer's brake valve device 10 shown in FIG. 1, and that the self-lapping regulating valve device 29 of the engineer's brake valve device 10 shown in FIG. 1 has been adjusted to supply fluid under pressure from the main reservoir passageway 290 (see FIG. 2) to a passageway and pipe 362 at a pressure corresponding to a preselected normal charged value determined by the setting of an adjusting screw 363 (see FIG. 2) of the self-lapping regulating valve device 29. The passageway 362 corresponds to the passageway 84 of the engineer's brake valve device 1 shown in FIG. 1A of the hereinbefore-mentioned Patent No. 2,958,561.

The pipe 362 is connected to the left-hand end of a double check valve device 364, the side outlet of which is connected by a pipe 365 to one end of a pipe T 366, the side outlet of which is connected by a pipe 367 and corresponding passageway to the chamber 93 of the cut-off valve device 12 shown in FIG. 1 of the drawings. The right-hand end of the double check valve device 364 is connected by a pipe 368 to the passageway in the engineer's brake valve device 10, shown in FIG. 1C of the drawings, that corresponds to the passageway 362, shown in FIG. 2.

The other or upper end of the pipe T 366 is connected by a pipe 369 to a passageway bearing the same numeral in the sectionalized casing of the brake application valve device 16 (FIG. 1A), which passageway has therein two branch passageways 369a and 369b. The branch passageway 369a opens at the surface of a counterbore 370 formed in the sectionalized casing of the brake application valve device 16, in which counterbore the release control valve 231 is slidably mounted. The branch passageway 369b opens into a chamber 371 on the outlet side of the check valve device 232.

An elongated cavity 372 formed on the periphery of the release control valve 231 connects the branch passageway 369a to a passageway 373 in the sectionalized casing of the brake application valve device 16, which passageway 373 is connected by an elongated cavity 374 formed on the periphery of the application valve 229 to a passageway 375 also in the sectionalized casing, which passageway 375 is connected by a pipe bearing the same numeral to one end of a pipe T 376. The side outlet of the pipe T 376 is connected by a pipe 377 to a passageway bearing the same numeral and extending through the pipe bracket 35 and casing sections 37 and 38 of the master controller device 11 to the chamber 60 therein above the diaphragm 55.

The opposite end of the pipe T 376 is connected by a pipe 378 to the side outlet of a pipe T 379. The left-hand end of the pipe T 379 is connected by a pipe 380 to a passageway bearing the same numeral in the sectionalized casing 27 (see FIG. 2) of the engineer's brake valve device 10 shown in FIG. 1 of the drawings. This passageway corresponds to the passageways 146, 148 of the engineer's brake valve device 1, shown in FIG. 1A of the hereinbefore-mentioned Patent No. 2,958,561.

The right-hand end of the pipe T 379 is connected by a pipe 381 to the passageway in the engineer's brake valve device 10 shown in FIG. 1C of the drawings that corresponds to the passageway 380 shown in FIG. 2.

The chamber 61 below the diaphragm 55 of the master controller device 11 is connected by a passageway 382 that extends through the cover 56, casing sections 38 and 37 and pipe bracket 35 and a pipe bearing the same numeral to one end of a pipe T 383, the side outlet of which is connected by a pipe 384 to the hereinbefore-mentioned volume reservoir 6. The opposite end of the pipe T 383 is connected by a pipe 385 having therein a choke 385a to a passageway bearing the same numeral that extends through the casing sections 74 and 92 of the cut-off valve device 12 and opens into the chamber 99 therein.

The chamber 77 in the cut-off valve device 12 is connected by a passageway 386 that extends through the cover 76 and casing section 74 thereof and a pipe bearing the same numeral to one end of a pipe T 387. The side outlet of the pipe T 387 is connected by a pipe 388 to a passageway bearing the same numeral in the sectionalized casing of the brake application valve device 16, which passageway leads to a chamber 389 above the hereinbefore-mentioned release control valve 231. The other end of the pipe T 387 is connected by a pipe 390 to the side outlet of a double check valve device 391, the left-hand end of which is connected by a pipe 392 to a passageway bearing the same numeral (see FIG. 2) in the sectionalized casing 27 of the engineer's brake valve device 10 shown in FIG. 1 of the drawings. This passageway corresponds to the passageway 103 of the engineer's brake valve device 1, shown in FIG. 1A of the hereinbefore-mentioned Patent No. 2,958,561.

The right-hand end of the double check valve device 391 is connected by a pipe 393 to the passageway in the engineer's brake valve device 10, shown in FIG. 1C of the drawings, that corresponds to the passageway 392, shown in FIG. 2.

Also assume initially that the application valve 229 and the suppression valve 230 of the brake application valve device 16 are in their normal position as shown in FIG. 1A, and that the handle 267 of the manually operated cut-out valve device 23 is in the position in which it is shown in FIG. 1, in which position a cock key 394 that is operated by the handle 267 is also in the position in which it is shown so that a passageway in the cock key 394 establishes a communication between pipes 266 and 268 to render the brake application valve device 16 operative by the train control or timing valve device 17 in response to an adverse track condition to cause a brake application. Under these conditions, the various components of the apparatus will be in the respective poistions in which they are shown in FIGS. 1, 1A, 1B and 1C of the drawings.

*Initial charging*

To initially charge the brake apparatus, the diesel engines are started for operating fluid compressors (not shown) to effect charging of the main reservoir 2. Assuming that the magnet valve device 233 is energized in response to a favorable track signal, this magnet valve device is operative to effect the supply of fluid under pressure from the outlet of the pressure reducing valve 234 via pipe 235 to the hereinbefore-mentioned piston chamber within the timing valve device 17 so that the hereinbefore-mentioned double-beat valve, also in the timing valve device 17, is closed to cut off communication between pipe 266 and the pipe 265 to prevent a train control brake application. With the pipe 266 thus cut off from the pipe 265, the brake apparatus will be charged in the following manner.

Fluid under pressure will be supplied from the main reservoir 2 via pipe 241, pipe T 240, pipe 239, pipe T 238, pipe and passageway 283, and branch passageway 283a to the chamber 294 below the diaphragm 280 that is operatively connected to the applicatioin valve 229 of the brake application valve device 16 at a substantially unrestricted rate and will also be supplied via choke 282 and the branch passageways 277e and 277d to the chamber 279 above the diaphragm 280 at a rate controlled by the choke 282. However, the choke 282 is of such flow capacity that despite the more rapid charging of the chamber 294, application valve 229 will remain in its normal position in which it is shown during initial charging because the pressure in chamber 294 will not exceed the pressure in chamber 279 by an amount sufficient to overcome the heavy bias of the spring 281 disposed in the chamber 279 subjecting the upper side of the diaphragm 280 to the force thereof, and because the lower end of the bore 260 in which the application valve 229 is slidably mounted will now be vented to atmosphere via passageway and pipe 259, check valve device 258, pipe T 256, pipe 261, pipe T 262 (see FIG. 1A), and pipe and passageway 263 (see FIG. 2) which is open to atmosphere through a passageway 395 in a spool-type valve 396 of the suppression valve device 33 of the engineer's brake valve device 10 shown in FIG. 1 of the drawings, while the handle 361 of this brake valve device occupies its "Release" position. The passageway 395 and spool-type valve 396 correspond respectively to the passageway 81 and the spool-type suppression valve 75 of the engineer's brake valve device 1 shown in FIG. 1A of hereinbefore-mentioned Patent No. 2,958,561.

The fluid under pressure supplied to the passageway 277d, as hereinbefore explained, will, in addition to flowing to the chamber 279, also flow via branch passageway 277b, passageway and pipe 277, pipe T 269, pipe 270, pipe T 271, pipe 272, and, at a restricted rate controlled by the choke 275, the pipe 276 to the timing reservoir 21 for charging the latter. The choke 275 is provided so as not to delay effective build-up of pressure in chamber 279. However, the check valve device 274, which is arranged in parallel with choke 275, provides for substantially unrestricted flow from timing reservoir 21 to pipe 273 in bypass of choke 275 upon the occurrence of a train control brake application.

As has been assumed, the handle 361 of the engineer's automatic brake valve device 10 shown in FIG. 1 of the drawings is in its "Release" position. Therefore, while the handle 361 is in its "Release" position, the self-lapping unit or regulating valve device 29 of this engineer's automatic brake valve device 10 will be actuated to supply fluid under pressure from the passageway and pipe 290, which, as shown in FIG. 1, is connected via pipe T 289 and pipe 241 to the main reservoir 2, to the passageway and pipe 362 which, as shown in FIG. 1, is connected to the left-hand end of the double check valve device 364. The fluid under pressure thus supplied to the left-hand end of the double check valve device 364 will move it to its right-hand position to establish a communication between the pipe 362 and the pipe 365 whereupon the fluid under pressure supplied to the pipe 362 will flow to the pipe 365 and thence through the pipe T 366 and pipe and passageway 369 and branch passageway 369a which opens at the wall surface of the counterbore 370. While the release control valve 231 occupies the position in which it is shown in FIG. 1A, the elongated cavity 372 thereon establishes a communication between the branch passageway 369a and the passageway 373 which, in turn, is connected by elongated cavity 374 on the application valve 229 to the passageway and pipe 375, which pipe is connected to one end of the pipe T 376. The side outlet of the pipe T 376 is connected by the pipe and corresponding passageway 377 to the chamber 60 above the diaphragm 55 of the master controller device 11. The other end of the pipe T 376 is connected by the pipe 378 to the side outlet of the pipe T 379. The left-hand end of the pipe T 379 is connected by a pipe 380 to the corresponding passageway in the sectionalized casing of the brake valve device 10 shown in FIG. 1 of the drawings. As shown in FIG. 2 of the drawings, the passageway 380 in the brake valve device 10 is connected to a chamber 397 at the left-hand side of a diaphragm 398 of the relay valve device 28 of the brake valve device 10. Also as shown in FIG. 2, the passageway 290 in sectionalized casing 27 of the brake valve device 10 is connected by a passageway 399 that leads to a supply valve chamber 400 of the relay valve device 28 of the brake valve device 10. Therefore, the fluid under pressure that is supplied to the chamber 397 deflects the diaphragm 398 in the direction of the right hand to effect unseating of a supply valve 401 whereupon fluid under pressure in the chamber 400 will flow therefrom past the supply valve 401 to a passageway 402. This passageway 402 corresponds to the passageway 59 shown in FIG. 1A of the hereinbefore-mentioned Patent No. 2,958,561. As shown in FIG. 2, the passageway 402 leads to the bottom of the brake pipe cut-off valve 30. Therefore, the fluid under pressure supplied to the passageway 402 will unseat the brake pipe cut-off valve 30 and flow therepast and thence through the remaining portion of the passageway 402 in the brake valve device 10 to the pipe 402 which, as shown in FIG. 1, is connected to the side outlet of a pipe T 403 that is disposed in the brake pipe 9. Therefore, the fluid under pressure that is supplied by the relay valve device 28 of the brake valve device 10 shown in FIG. 1 of the drawings flows to the brake pipe 9.

The fluid under pressure supplied via the pipe and passageway 402 and pipe T 403 to the brake pipe 9 from the relay valve device 28 of the engineer's automatic brake valve device 10 shown in FIG. 1 of the drawings will therefore charge the brake pipe 9 to a pressure corresponding to the pressure for which the regulating valve device 29 of this brake valve device 10 has been adjusted.

As the main reservoir 2 is charged by operation of the fluid compressors, fluid under pressure will flow therefrom via pipe 241, pipe T 289, and pipe and corresponding passageway 290 to the passageway 399 in the sectionalized casing 27 of the engineer's brake valve device 10 shown in FIG. 1 of the drawings. As shown in FIG. 2, the passageway 399 has a branch thereof that opens into chambers 404 and 405, respectively, in the emergency valve device 32 and suppression valve device 33 of the engineer's brake valve device 10. Therefore, fluid under pressure supplied from the main reservoir 2 to the passageway 399 will flow to the chambers 404 and 405.

While the handle 361 of the brake valve device 10 occupies its "Release" position, a spring 406 disposed in the chamber 405 is effective to bias the spool-type suppression valve 396 to the position in which it is shown in FIG. 2, in which position it is effective to open a communication between the chamber 405 and passageway 392. Therefore, fluid at main reservoir pressure will flow from the chamber 405 to the passageway 392 and corresponding pipe which, as shown in FIG. 1, is connected to the left-hand end of the double check valve device 391. Fluid under pressure thus supplied to the left-hand end of the double check valve device 391 will move the valve therein to a position to establish a communication between the pipe 392 and the pipe 390 whereupon the fluid at main reservoir pressure will flow from pipe 392 to pipe 390 which is connected to one end of pipe T 387, the side outlet of which connected via pipe and passageway 388 to the chamber 389 above release control valve 231 in the brake application valve device 16. The lower end of the counterbore 370 in which the valve 231 is slidably mounted is connected by a passageway 407 in the sectionalized casing of the brake application valve device 16 to the lower end of the bore 260 which is now vented to atmosphere as previously explained. Consequently, the fluid under pressure supplied through pipe and passageway 388 to chamber 389 will thus positively bias the release control valve 231 to its normal lower position in which it is shown in FIG. 1A of the drawings.

The fluid under pressure supplied from main reservoir 2 to pipe T 387 in the manner explained above also flows therefrom via the pipe 386 and corresponding passageway to the chamber 77 of the cut-off valve device 12 to deflect the diaphragm 75 thereof downward against the yielding resistance of the spring 82 to first effect seating of the valve 87 on the valve seat 89 and then unseat valve 97 from its valve seat 98. With the valve 97 unseated, a communication is established between the chambers 93 and 99 to connect the passageway and pipe 367 that is connected to the side outlet of the pipe T 366 to the passageway and pipe 385 that is connected to one end of the pipe T 383 (FIG. 1A).

The fluid under pressure supplied to the pipe 362 by the self-lapping regulating valve device 29 of the engineer's brake valve device 10, shown in FIG. 1 of the drawings, as hereinbefore mentioned, will now flow from the pipe 362 via double check valve device 364 and pipe 365 to one end of the pipe T 366 from whence it flows via the side outlet thereof and pipe and passageway 367, chamber 93 of the cut-off valve device 12, past the now unseated valve 97, chamber 99, passageway and pipe 385 and choke 385a to one end of pipe T 383. Since the opposite end of pipe T 383 is connected by pipe and passageway 382 to the chamber 61 of the master controller device 11, and the side outlet of pipe T 383 is connected by pipe 384 to the volume reservoir 6, the chamber 61 and volume reservoir 6 will be respectively simultaneously charged to the pressure corresponding to the hereinbefore-mentioned preselected normal charged value determined by the setting of the self-lapping regulating valve device 29 of the engineer's brake valve device 10 shown in FIG. 1 of the drawings.

The fluid under pressure supplied to the one end of the pipe T 366, as explained above, also flows from the opposite end of this pipe T via pipe and passageway 369, branch passageway 369a, elongated cavity 372 on the periphery of release control valve 231, passageway 373, elongated cavity 374 on the periphery of application valve 229, and passageway and pipe 375 to the upper end of pipe T 376. Since the side outlet of pipe T376 is connected via pipe and passageway 377 to the chamber 60 above the diaphragm 55 of the master controller device 11, the chamber 60 will now be charged with fluid under pressure simultaneously as the chamber 61 below the diaphragm 55 is charged and to the same pressure.

The fluid under pressure supplied to the pipe T 376 also flows via pipe 378, pipe T 379, pipe 380 and corresponding passageway (see FIG. 2) to the chamber 397 of the relay valve device 28 of the engineer's brake valve device 10 shown in FIG. 1 of the drawings.

The fluid under pressure thus supplied to the chamber 397, while the handle 361 is in its "Release" position, will actuate the relay valve device 28 to effect supply of fluid under pressure from the chamber 400 thereof, which is connected to the main reservoir 2 as hereinbefore explained, to the brake pipe 9 via passageway and pipe 402 and pipe T 403, to charge the brake pipe 9 to a pressure corresponding to the hereinbefore-mentioned preselected normal charged value.

The brake control valve device 14 (FIG. 1B) on the locomotive or self-propelled passenger car will respond to the charging of the brake pipe 9 by the relay valve device 28 of the engineer's brake valve device 10, shown in FIG. 1 of the drawings, to connect the left-hand end of the double check valve device 25 (FIG. 1B) via pipe 228, pipe T 227 and pipe and passageway 226, to an exhaust passageway 408 (FIG. 3) that extends through the casing section 223 and pipe bracket 205, and to charge the auxiliary reservoir 3, control reservoir 4, and selector volume reservoir 5, as explained in the hereinbefore-mentioned Patent No. 3,018,138.

The side outlet of the double check valve device 25 is connected by a pipe 409 to the side outlet of a pipe T 410, the right-hand end of which is connected by a pipe 411 to one outlet of the hereinbefore-mentioned pipe cross 324 (FIG. 1C), the opposite outlet of which is connected by a pipe and passageway 412 to the chamber 86 of the emergency valve device 323.

The chamber 77 of the emergency valve device 323 is connected by a passageway and pipe 413 to the side outlet of a pipe T 414. The hereinbefore-mentioned passageway 110 (FIG. 4) in the pipe bracket 103 of the magnet valve device 13 is connected by a pipe bearing the same numeral to one end of the pipe T 414. The other end of the pipe T 414 is connected by a pipe 415 to the side outlet of a pipe T 416 that is disposed in the brake pipe 9. Therefore, while the brake pipe 9 is charged, fluid under pressure will flow therefrom via pipe 415, pipe T 414 and pipe and passageway 413 to the chamber 77 of the emergency valve device 323. The fluid under pressure thus supplied to the chamber 77 of the emergency valve device 323 is effective to deflect the diaphragm 75 thereof downward to first effect seating of the valve 87 and subsequently unseating of the valve 97 of this valve device.

With the valve 97 of the emergency valve device 323 unseated, a communication is established between the chamber 99 into which opens a passageway to which the pipe 320 is connected, as hereinbefore stated, and the chamber 93 which is connected by a passageway and corresponding pipe 417 to the chamber 296 of the fluid pressure operated relay valve device 24. Consequently, while the brake pipe 9 is charged to release the pneumatic brakes and the dynamic brakes are also released so that the solenoid 334 of the lockout magnet valve device 317 is deenergized, the chamber 296 of the fluid pressure operated relay valve device 24 (FIG. 1C) is open to atmosphere via passageway and pipe 417, chambers 93 and 99 of the emergency valve device 323, passageway and pipe 320, chambers 329 and 333 of the lockout magnet valve device 317, passageway and pipe 321, pipe cross 324, pipe 411, pipe T 410 (FIG. 1B), pipe 409, double check valve device 25, pipe 228, pipe T 227, and pipe and passageway 226 which is open to atmosphere via the exhaust passageway 408 (FIG. 3) of the control valve device 14, as hereinbefore mentioned.

Since the volume reservoir 8 is connected to pipe cross 324 by pipe 325, volume reservoir 8 is also vented to atmosphere.

With the chamber 296 of the fluid pressure operated relay valve device 24 open to atmosphere as explained above, this relay valve device will be in its release position in which it is shown in FIG. 1C of the drawings so that the brake cylinder device 1 will be opened to atmosphere via pipe and passageway 301, bore 300, counterbore 303 in valve stem 302, and exhaust passageway 305, thereby releasing the brakes on the locomotive or self-propelled passenger car.

The volume reservoir 7 (FIG. 1B) has a chosen volume and is normally charged with fluid under pressure from the main reservoir 2 through a pneumatic stick valve device 418 shown in outline in FIG. 1B of the drawings, which valve device is also identical in construction to the hereinbefore-described fluid pressure operated cut-off valve device 12 shown in FIG. 1. The chamber 93 of the pneumatic stick valve device 418 is connected by a passageway and pipe 419 to the volume reservoir 7, and the chamber 86 of this valve device is connected by a passageway and pipe 420 to the upper end of the hereinbefore-mentioned pipe T 311. Therefore, in the absence of fluid under pressure in the diaphragm chamber 77 of the pneumatic stick valve device 418, fluid under pressure will flow from the main reservoir 2 to the volume reservoir 7 via pipe 241, pipe T 240, pipe 291, pipe T 313, pipe 312, pipe T 311, pipe and passageway 420, chambers 86 and 93 of the pneumatic stick valve device 418, and passageway and pipe 419 so that the volume reservoir 7 is normally charged to the pressure carried in the main reservoir 2.

The diaphragm chamber 77 of the pneumatic stick valve device 418 is connected by a passageway and pipe 421 to one end of a pipe T 422, the other end of which pipe T 422 is connected by a pipe and passageway 423 that opens at the wall surface of a bore 424 (FIG. 3) in a casing section 425 of the emergency portion 206 of the brake control valve device 14. The hereinbefore-mentioned passageway 114 (FIG. 4) in the pipe bracket 103 of the magnet valve device 13 is connected by a pipe bearing the same numeral to the side outlet of the pipe T 422.

In order to provide for venting passageway 423 and thereby the diaphragm chamber 77 of the pneumatic stick valve device 418 to atmosphere while the brakes are released, the hereinbefore-mentioned brake pipe vent valve 214 (FIG. 3) of the emergency portion 206 of the brake control valve device 14 has a cylindrical stem 426 formed integral therewith and slidably mounted in the above-mentioned bore 424 in casing section 425. Intermediate its ends the cylindrical stem 426 is provided with a peripheral annular groove 427 which, while the cylindrical stem 426 occupies the position in which it is shown in FIG. 3, establishes a communication between the passageway 423 in the casing section 425 and an atmospheric port 428 in this casing section.

The chamber 99 in the pneumatic stick valve device 418 (FIG. 1B) is connected by a passageway and pipe 429 to one end of a pipe T 430 that has a choke disposed in its side outlet and open to atmosphere. The other end of pipe T 430 is connected by a pipe 431 to the inlet of a check valve device 432. The outlet of the check valve device 432 is connected by a pipe and passageway 433 to the quick action chamber 212 (FIG. 3) in the pipe bracket 205 of the brake control valve device 14.

While the chambers 60 and 61 of the master controller device 11 are charged to the same pressure as hereinbefore described, the spring 51 is effective to bias the stem 43, diaphragms 45 and 55 and pusher stem 62 to the position in which they are shown in FIG. 1A of the drawings, it being noted that the chamber 40 above the diaphragm 45 and the volume chamber 53 connected thereto by the passageway 52 are now open to atmosphere via a choke 434, a passageway and pipe 435 that is connected to the left-hand end of the hereinbefore-mentioned pipe T 410, pipe 409, double check valve device 25, pipe 228, pipe T 227, pipe 226 and the corresponding passageway in the brake control valve device 14 which, as hereinbefore stated, is connected to the exhaust passageway 408 (FIG. 3).

While the stem 43 of the master controller device 11 occupies the position in which it is shown in FIG. 1A of the drawings, the movable contact 66 carried thereby is disposed out of contact with the release contact 71 which is connected by a release wire 436 to the positive terminal of the solenoid 202 (FIGS. 1B and 4). The negative terminal of the solenoid 202 is connected by a return wire 437 to the negative terminal of the battery 69 (FIG. 1A).

Also, while the stem 43 occupies the position in which it is shown in FIG. 1A, the movable contact 65 also carried by the stem 43 is disposed out of contact with the application contact 73 which is connected by an application wire 438 to the positive terminal of the solenoid 182 (FIGS. 1B and 4). The negative terminal of the solenoid 182 is connected to the return wire 437 by a wire 439.

The release wire 436, the return wire 437, and the application wire 438 have respective branch wires 436a, 437a and 438a that extend to each end of the locomotive or self-propelled passenger car where they may be coupled or connected to corresponding release, return and application wires on an adjacent car in a train in order that solenoids on the adjacent car or cars corresponding to the solenoids 202 and 182 may be controlled and operated by the master controller device 11 when this device is located on the locomotive or leading car in the train.

Since the movable contacts 66 and 65 are shown disposed out of contact respectively with the release contact 71 and the application contact 73, the solenoids 202 and 182 will be deenergized. While the solenoid 202 is deenergized, the double-beat poppet valve 192 (FIG. 4) will be unseated from the lower annular valve seat 198 and seated against the upper annular valve seat 199 by the spring 197, as shown in FIG. 4 of the drawings, to open a communication between chambers 191 and 194. Likewise, while the solenoid 182 is deenergized, the service valve 176 is seated by spring 175 against the annular valve seat 177 to close communication between chambers 174 and 179.

*Manually effected electro-pneumatic service brake application*

At the time the engineer initiates a brake application, he moves the handle of a propulsion controller (not shown) to a position to effect the cut-off of propulsion power to the driving motors of the diesel-electric locomotive or self-propelled passenger car and to set up dynamic brake control circuitry as a result of which the lockout magnet valve device 317 (FIG. 1C) is energized to effect unseating of the valve 330 to establish a communication between chambers 329 and 332 and seating of the valve 331 to close communication between chambers 329 and 333 until the current flowing in the dynamic brake control circuit fades out or is reduced below a certain chosen value.

Now to manually effect an electro-pneumatic service application of brakes on the locomotive or the leading self-propelled passenger car and the connected cars of a train, the engineer will move the handle 361 of the engineer's brake valve device 10, shown in FIG. 1 of the drawings, arcuately from its "Release" position into an application zone (extending between "Release" position and a "Service" position) an extent corresponding to the degree of service application desired.

As shown in FIG. 2 of the drawings, the spring 406 biases the right-hand end of the spool-type valve 396 against a cam 440 that is carried on a shaft 441 that is rotatably mounted in the sectionalized casing 27 of the brake valve device 10 for rotation by the handle 361. The contour of the cam 440 is such that upon initial rotation of the handle 361 out of its "Release" position and into the application zone, the spool-type valve 396 is moved by the cam 440 in the direction of the left hand against the yielding resistance of the spring 406 to a position in which the left-hand end of the passageway 395 in the spool-type valve 396 registers with the end of the passageway 392. Upon the passageway 395 moving into registry with the passageway 392, fluid under pressure will be vented from the chamber 77 of the cut-off valve device 12 shown in FIG. 1 to atmosphere via passageway and pipe 386, pipe T 387, pipe 390, double check valve device 391, pipe and passageway 392, passageway 395 in spool-type valve 396 (FIG. 2), and the interior of the sectionalized casing 27 which is open to atmosphere. As fluid under pressure is thus vented from the chamber 77, the spring 82 is rendered effective to move diaphragm 75, diaphragm follower 81, stem 85 and valve 87 upward. As the valve 87 is thus moved upward, the spring 100 is rendered effective to move valve 97 and cylindrical valve member 90 upward until the valve 97 seats on annular valve seat 98 to close communication between chambers 93 and 99. Further upward movement of the diaphragm 75, diaphragm follower 81 and stem 85 lifts valve 87 from valve seat 89 to open communication between the chambers 93 and 86, the latter being connected to a passageway in the casing section 74 which is closed at the bolting face 101 by a plug 442 carried in the pipe bracket 102.

While the valve 97 is seated on the annular valve seat 98, the fluid under pressure in chamber 61 in the master controller device 11 and in the volume reservoir 6 connected thereto is trapped therein since the chamber 99 is connected to the chamber 61 via passageway and pipe 385, pipe T 383 and pipe and passageway 382.

As explained in detail in the hereinbefore-mentioned Patent No. 2,958,561, when the handle 361 is moved into the application zone, the self-lapping control valve 29 of the brake valve device 10 shown in FIG. 1 is operated to vent fluid under pressure from the chamber 60 of the master controller device 11 via passageway and pipe 377, pipe T 376, pipe and passageway 375, elongated cavity 374 on the periphery of the application valve 229, passageway 373, elongated cavity 372 on the periphery of the release control valve 231, branch passageway 369a, passageway and pipe 369, pipe T 366, pipe 365, double check valve device 364, and pipe and passageway 362 and said control valve device 29 to atmosphere until the pressure in the chamber 60 is reduced to a pressure corresponding to the degree of service brake application desired. Since the chamber 397 of the relay valve device 28 (FIG. 2) is connected via passageway and pipe 380, pipe T 379 and pipe 378 to the pipe T 376, the pressure in the chamber 397 will be reduced simultaneously as the pressure in the chamber 60 of the master controller device 11 is reduced.

As the fluid under pressure is reduced in the chamber 60 of the master controller device 11 in the manner just explained, the higher trapped pressure in the chamber 61 and volume reservoir 6 connected thereto will deflect the diaphragm 55 in an upward direction and, through the intermediary of the pusher stem 62, move the stem 43 and movable contacts 66 and 65 carried thereby upward to first cause the movable contact 66 to be brought into contact with the release contact 71. With contact thus made beween the contacts 66 and 71, a circuit is closed to effect energization of the solenoid 202. This circuit may be traced from the positive terminal of the battery 69 via wires 68 and 67, contacts 66 and 71, release wire 436 to the positive terminal of the solenoid 202, thence through the coil of the solenoid 202 to the negative terminal thereof and return wire 437 to the negative terminal of the battery 69.

Since the release wire 436 and the return wire 437 are connected by the respective branch wires 436a and 437a to corresponding release and return wires on the adjacent car or cars in the train, the solenoids on these other cars in the train corresponding to the solenoid 202 and connected to these wires will also be energized and will operate in the same manner as the solenoid 202 as will now be described.

Upon energization of the solenoid 202 in the manner just described, the plunger 201 (FIG. 4) thereof will be moved downward to effect, through the intermediary of the stem 200, unseating of double-beat valve 192 from the upper annular valve seat 199 and seating on the valve 192 on the lower annular valve seat 198. With the double-beat valve 192 seated on the lower annular valve seat 198, the chamber 194 is cut off from the chamber 191 which is open to atmosphere via passageway and pipe 115 (FIG. 1B), pipe T 227, and pipe and passageway 226 (FIG. 3) which is connected to the exhaust passageway 408 while the brake control valve 14 occupies its release position. Therefore, the fluid under pressure supplied to the chamber 194 while the solenoid 182 is energized, as will now be described, cannot flow to atmosphere.

As the fluid under pressure continues to reduce in the chamber 60 of the master controller device 11 (FIG. 1A) subsequent to the movable contact 66 contacting the release contact 71 to close the circuit to the solenoid 202, the higher trapper pressure in the chamber 61 and connected volume reservoir 6 will further deflect the diaphragm 55 in an upward direction and, through the intermediary of the pusher stem 62, move the stem 43 and movable contacts 66 and 65 carried thereby further upward until the movable contact 65 is brought into contact with the application contact 73. Upon contact thus being made between contacts 65 and 73, a circuit is closed to effect energization of the solenoid 182. This circuit may be traced from the positive terminal of the battery 69 via wires 68 and 67, contacts 65 and 73, application wire 438 to the positive terminal of the solenoid 182, thence through the coil of the solenoid 182 to the negative terminal thereof, wire 439, and return wire 437 to the negative terminal of the battery 69.

Since the application wire 438 and the return wire 437 are connected by the respective branch wires 438a and 437a to corresponding application and return wires on the adjacent car or cars in the train, the solenoids on these other cars in the train corresponding to the solenoid 182 and connected to these wires will also be energized and will operate in the same manner as the solenoid 182, as will now be described.

Upon energization of the solenoid 182 in the manner just described, the plunger 181 (FIG. 4) thereof is moved downward to, through the intermediary of the fluted stem 180, effect unseating of the service valve 176 from the annular valve seat 177. The chamber 174 is connected via passageway 111, chamber 131 in cut-off valve device 106, bore 130, chamber 120, and passageway and pipe 108 to the control reservoir 4. Therefore, when the service valve 176 is unseated in the manner just described, fluid under pressure will flow from the chamber 174 and control reservoir 4 to the chamber 296 (FIG. 1C) of the fluid pressure operated relay valve device 24 as will now be described. Fluid under pressure flows from chamber 174 via bore 178 (FIG. 4), chamber 179 and passageway 183 to counterbore 184 to effect unseating of valve 189 from its seat 186. With the valve 189 unseated from its seat 186, fluid under pressure will flow from the counterbore 184 to the chamber 188 and thence via service choke 190 to the passageway 113 in the pipe bracket 103 of the magnet valve device 13. The passageway 113 is connected to the passageway 116 that opens into the chamber 194 and to the pipe 113 (FIG. 1B) that is connected to the right-hand end of the double check valve device 25. Therefore, the fluid under pressure supplied to the passageway 113, upon unseating of the service valve 176, flows to the chamber 194 and to the right-hand end of the double check valve device 25 to move the slide valve therein to its left-hand position to establish a communication from the pipe 113 to the pipe 409 whereupon fluid under pressure flows from pipe 113 to pipe 409 and thence via pipe T 410, pipe 411, pipe cross 324, and pipe and passageway 321 to the chamber 350 in the inshot valve device 318.

Since the spring 360 is stronger than the spring 358, initially the spring 360 will be effective to bias the plunger 342 upward from the position in which it is shown in FIG. 1C to a position in which a collar 443 on the plunger 342 abuts a stop 444 formed on the casing 337. In this position of the plunger 342, the release valve 353 is seated on its corresponding annular valve seat 357 formed on the plunger 342, and the supply valve 351 is unseated from its corresponding annular valve seat 355. Therefore, the fluid under pressure supplied to the chamber 350 in the manner described above will now flow therefrom past the unseated supply valve 351 to chamber 346 and thence via passageway 322, chambers 332 and 329 in the lockout magnet valve device 317, passageway and pipe 320, chambers 99 and 93 in the emergency valve device 323, and pipe and passageway 417 to the chamber 296 in the fluid pressure operated relay valve device 24.

The fluid under pressure supplied to the chamber 346, as described above, also flows therefrom via passageway 322, branch passageway 322a, and choke 349 to the chamber 341 above the diaphragm 336. Fluid under pressure will flow to the chamber 341 until the pressure therein is increased sufficiently to deflect the diaphragm 336 downward against the yielding resistance of the spring 360. As the diaphragm 336 is thus deflected downward, the plunger 342 and annular valve seat 357 are likewise moved downward. Therefore, the spring 354 acting on the supply valve 351 is rendered effective through the stem 352 to maintain the exhaust valve 353 seated on its corresponding valve seat 357 so that the valves 351 and 353 and stem 352 move downward simultaneously with the plunger 342 until the supply valve 351 is moved into seating contact with the annular valve seat 355, in which position it is shown in FIG. 1C. Upon seating of the supply valve 351 on its corresponding valve seat 355, the supply of fluid under pressure to the chamber 296 in the fluid pressure operated relay valve device 24 is cut off. The force of spring 360 is such as to thus permit seating of the supply valve 351 when the pressure of fluid obtained in passageways 322 and 320 and chamber 296 is increased to a chosen degree, such as ten pounds per square inch. If, due to leakage of fluid under pressure from passageway 321 past the supply valve 351, the pressure of fluid in passageways 322 and 320 and thereby in diaphragm chamber 341 should tend to increase above the chosen degree of ten pounds per square inch, the diaphragm 336 will be deflected by such pressure against the spring 360 to open the release valve 353 for dissipating the excess pressure whereby the pressure in said passageways and chamber 296 will be maintained at substantially the desired degree.

The fluid under pressure supplied to chamber 296 in the fluid pressure operated relay valve device 24 actuates the valve device 24 to supply fluid under pressure to the brake cylinder device 1 at a corresponding pressure of ten pounds per square inch. This pressure of fluid provided in the brake cylinder device 1 is merely sufficient to fill the volume thereof and to move the usual brake shoes into contact lightly with the car wheels, so that when the pneumatic brake on the car becomes effective to bring the car to a stop after fading out of the dynamic brake, as will be hereinafter described, there will be no undue delay or roughness of car action at the time of such transfer.

When the speed of the locomotive or self-propelled car has been reduced to, for example, 10 miles per hour, where the effectiveness of the dynamic brake begins to reduce, the magnet 334 of the lockout magnet device 317 will become deenergized which will permit spring 335 to open valve 331 and close valve 330, whereupon pressure of fluid in the passageway 321 will equalize through a choke 445, past the open valve 331, to the chamber 329 and thence through the passageway and pipe 320, the emergency valve device 323, and the pipe and passageway 417 to the chamber 296 of the relay valve device 24 and operate this relay valve device to increase the pressure of fluid in the brake cylinder device 1 to substantially the same degree as acting in the passageway 321 for bringing the locomotive or self-propelled car to a stop. At around 4 miles per hour, the effectiveness of the dynamic brake will be substantially nothing, and the choke 445 is provided for regulating the rate at which the pneumatic brakes become effective as just described in accordance with the reducing effectiveness of the dynamic brake so as to minimize car shock upon transfer of braking from dynamic to purely pneumatic.

The fluid under pressure supplied from the control reservoir 4 to the pipe T 410 upon the unseating of the service valve 176, in addition to flowing via the pipe 411 and the inshot valve device 318 to the fluid pressure operated relay device 24 as has been explained, also flows via pipe and passageway 435 and choke 434 to volume reservoir 53 (FIG. 1A) and thence via passageway 52 to the chamber 40 above the diaphragm 45 of the master controller device 11. Fluid under pressure thus supplied to the chamber 40 is effective to establish a force that acts in a downward direction on the upper side of the diaphragm 45. Upon this force slightly exceeding the force acting upward on the diaphragm 55 as a result of the reduction of the pressure in the chamber 60 in the manner hereinbefore explained, the diaphragm 45 will be deflected downward to move the stem 43 downward until the movable contact 65 is moved out of contact with the application contact 73 to open the hereinbefore-described circuit for energizing the solenoid 182. Upon deenergization of the solenoid 182, the spring 175 (FIG. 4) is rendered effective to seat service valve 176 on its corresponding annular valve seat 177. This cuts off flow of fluid under pressure from the control reservoir 4 to the fluid pressure operated relay valve device 24 via the dynamic interlock valve device 26, and to the chamber 40 of the master controller 11 to prevent further deflection of the diaphragm 45 and downward movement of the stem 43 and movement of contact 66 out of contact with the release contact 71. Therefore, the circuit to the solenoid 202 remains energized to maintain the valve 192 (FIG. 4) seated on the lower annular valve seat 198 to prevent a release of the brakes. Consequently, after the pressure of fluid in the chamber 60 of the master controller device 11 becomes stabilized at a value determined by the position in the application zone to which the engineer moved the handle 361 of the engineer's brake valve device 10 shown in FIG. 1, the supply of fluid under pressure from the control reservoir 4 to the dynamic interlock valve device 26 and thence to the fluid pressure operated relay valve device 24, if the dynamic brakes have faded out, and to the chamber 40 of the master controller device 11 will be terminated so that the relay valve device 24 in turn moves to a lap position to correspondingly terminate the supply of fluid under pressure to the brake cylinder device 1. The seating of the service valve 176 (FIG. 4) on the annular valve seat 177 is effective to hold the desired pressure of fluid in the pipe 411 connected via the dynamic interlock valve device 26 to the fluid pressure operated relay valve device 24 and hence in the brake cylinder device 2.

As hereinbefore stated, the pressure in the chamber 397 (FIG. 2) of the relay valve device 28 of the brake valve device 10, shown in FIG. 1 of the drawings, is reduced simultaneously as the pressure in the chamber 60 of the master controller is reduced. Therefore, this relay valve device 28 will operate in response to this reduction of pressure in the chamber 397 to correspondingly vent brake pipe 9 and the chamber 222 (FIG. 3) above the diaphragm 217 of the brake control valve device 14 to atmosphere via passageway and pipe 15 (FIG. 1B), brake pipe 9, pipe T 403 (FIG. 1), and pipe and passageway 402 (FIG. 2), past a now unseated exhaust valve 446, an exhaust valve chamber 447, and a passageway 448 that has two parallel branch passageways open to atmosphere, one of which is restricted by having therein a choke 449. The size of the choke 449 and the unrestricted branch of the passageway 448 (FIG. 2) is such as to provide for the flow of fluid under pressure from the chamber 222 (FIG. 3) and the brake pipe 9 to atmosphere at substantially the same rate as fluid under pressure flows from the chamber 219 (FIG. 3) and the control reservoir 4 past the unseated service valve 176 (FIG. 4) and thence via the service choke 190, double check valve device 25 (FIG. 1B), dynamic interlock valve device 26, and emergency valve device 323 to the fluid pressure operated relay valve device 24 to cause said relay valve device to operate to effect the supply of fluid under pressure to the brake cylinder device 1 to effect a brake application on the locomotive or self-propelled passenger car.

Accordingly, the simultaneous reduction of pressure in the chambers 222 and 219 (FIG. 3) on the opposite sides of the diaphragm 217 at substantially the same rate prevents operation of the brake control valve device 14 to effect an automatic-pneumatic service brake application on the locomotive or self-propelled car.

Release of an electro-pneumatic service brake application

To release an electro-pneumatic service brake application on the locomotive or the leading self-propelled passenger car and the connected cars of a train coupled thereto, the handle 361 of the engineer's brake valve device 10 shown in FIG. 1 of the drawings is moved from the position it occupies in its application zone in the direction of its "Release" position back to this positon. When the handle 361 is thus returned to its "Release" position, the cam 440 (FIG. 2) carried on the shaft 441 is moved to a position to render the spring 406 effective to move the spool-type valve 396 to the position shown in FIG. 2 to open a communication between the chamber 405 and passageway and pipe 392 and to connect the pipe and passageway 263 to the passageway 395 in the spool-type valve 396, which passageway 395 is open to atmosphere.

Since fluid at main reservoir pressure is present in chamber 405, fluid under pressure will now flow from chamber 405 to the chamber 77 of the cut-off valve device 12 shown in FIG. 1 via passageway and pipe 392, double check valve device 391, pipe 390, pipe T 387, and pipe and passageway 386. Fluid under pressure thus supplied to the chamber 77 is effective to deflect diaphragm 75 downward against the yielding resistance of the spring 82 to first effect seating of the valve 87 on the valve seat 89 and then unseating of valve 97 from its valve seat 98.

Also, when the handle 361 of the brake valve device 10 is returned to its "Release" position, a cam 450 carried on the shaft 441 effects operation of the self-lapping control valve device 29 in the manner described in detail in hereinbefore-mentioned Patent No. 2,958,561, to supply fluid under pressure from the main reservoir 2 to the passageway and pipe 362 (FIG. 1).

Fluid under pressure thus supplied to the pipe 362 flows via double check valve device 364, pipe 365, pipe T 366, pipe and passageway 367, chamber 93 in cutoff valve device 12, past unseated valve 97, chamber 99, passageway and pipe 385, choke 385a, pipe T 383, and pipe and passageway 382 to the chamber 61 in the master controller device 11 at a rate controlled by choke 385a. Fluid under pressure also flows from the pipe T 383 via pipe 384 to the volume reservoir 6 to charge this reservoir.

Fluid under pressure supplied to the pipe T 366, as described above, also flows therefrom via pipe and passageway 369 (FIG. 1A), branch passageway 369a, elongated cavity 372 formed on release control valve 231, passageway 373, elongated cavity 374 formed on application valve 229, passageway and pipe 375, pipe T 376, and pipe and passageway 377 to the chamber 60 in the master controller device 11.

Since the rate of flow of fluid under pressure to the chamber 61 is controlled by the choke 385a, the pressure in the chamber 60 will increase more rapidly than in the chamber 61 and establish a differential of pressure that deflects the diaphragm 55 downward to render the spring 51 effective to move the diaphragm 45 and stem 43 downward whereupon the contact 66 carried by stem 43 is moved away from the release contact 71 to open the circuit and deenergize the solenoid 202 and the corresponding solenoids on the other cars in the train to effect a release of the brakes on these cars in the same manner as will now be described for the locomotive or leading self-propelled passenger car.

Upon deenergization of the solenoid 202, the spring 197 (FIG. 4) is rendered effective, through the intermediary of snap ring 196 and fluted stem 195, to unseat the double-beat valve 192 from the lower annular valve seat 198 and to seat the valve 192 on the upper annular valve seat 199.

Let it be assumed that the dynamic brakes have faded out so that the solenoid 334 (FIG. 1C) of the inshot valve device 317 is deenergized. Therefore, when deenergization of the solenoid 334 occured, the spring 335 effected unseating of valve 331 to open a communication between chambers 329 and 333 and seating of valve 330 to close communication between chambers 329 and 332.

Consequently, fluid under pressure will now flow from the chamber 296 of the fluid pressure operated relay valve device 24 (FIG. 1C) to atmosphere via passageway and pipe 417, chambers 93 and 99 in the emergency valve device 320, passageway and pipe 320, chambers 329 and 333 in the lockout magnet valve device 317, passageway and pipe 321, pipe cross 324, pipe 411, pipe T 410 (FIG. 1B), pipe 409, double check valve device 25, pipe and passageway 113, passageway 116 (FIG. 4), chamber 194, bore 193, chamber 191, passageway and pipe 115, pipe T 227 (FIG. 1B), and pipe and passageway 226 (FIG. 3) which is connected to the exhaust passageway 408 while the brake control valve device 14 is in its release position.

The relay valve device 24 will now operate in response to the venting of fluid under pressure from the chamber 296 thereof to release fluid under pressure from the brake cylinder device 1 to effect a release of the brakes on the locomotive or self-propelled passenger car.

As fluid under pressure is released from the chamber 296 of the fluid pressure operated relay valve device 24 as described above, fluid under pressure will also be simultaneously released from the chamber 40 and volume chamber 53 of master controller device 11 (FIG. 1A) via passageway 52, choke 434, passageway and pipe 435, pipe T 410, and thence to atmosphere through the path traced above for the release of fluid under pressure from the chamber 296 of the relay valve device 24.

Fluid under pressure will flow through the choke 385a to the chamber 61 in the master controller device 11 as described above until the pressure in the chamber 61 increases to that in the chamber 60, which pressure is the preselected normal pressure determined by the setting of the adjusting screw 363 of the self-lapping regulating valve device 29 of the engineer's brake valve device 10 shown in FIG. 1 of the drawings.

Fluid under pressure supplied to the pipe T 376 in the manner described above, in addition to flowing to the chamber 60 in the master controller device 11, also flows from the pipe T 376 via pipe 378, pipe T 379, and pipe and passageway 380 to the chamber 397 of the relay valve device 28 of the brake valve device 10, shown in FIG. 1 of the drawings, to operate this relay valve device 28 to effect charging of the brake pipe 9 to the hereinbeforementioned preselected normal pressure.

The brake control valve device 14 will respond to the charging of the brake pipe 9 by the relay valve device 28 of the engineer's brake valve device 10 to effect charging of the chambers 222 and 219 (FIG. 3) on the opposite sides of the diaphragm 217 and to charge the auxiliary reservoir 3, control reservoir 4 and selector volume reservoir 5 as explained in the hereinbefore-mentioned Patent No. 3,018,138.

*Manually effected electro-pneumatic emergency brake application*

To effect an electro-pneumatic emergency application of brakes, the handle 361 of engineer's brake valve device 10 shown in FIG. 1 of the drawings is moved to its "Emergency" position in which the vent valve device 31 (FIG. 2) is opened to vent fluid under pressure from the brake pipe 9 at an emergency rate, it being understood that the brake valve device 10 will perform all the service operations hereinbefore described since the handle 361 is moved through the service application zone to its "Emergency" position. Therefore, the master controller device 11 operates in the manner hereinbefore described to effect energization of the solenoids 202 and 182 which respectively effect seating of the double-beat valve 192 on the lower annular valve seat 198 to close communication between the chamber 194 and atmosphere, and unseating of the service valve 176 from its corresponding annular valve seat 177 to effect the supply of fluid under pressure from the control reservoir 4 to the fluid pressure operated relay valve device 24 in the manner hereinbefore described.

When the handle 361 is moved to its "Emergency" position, a cam 451 (FIG. 2) carried on the shaft 441 shifts a movable contact 452 against the yielding resistance of a spring 453 into contact with two stationary contacts 454 and 455. The stationary contact 454 is connected by a wire 456 to the wire 68 (FIG. 1A) which is connected to the positive terminal of the battery 69, and the stationary contact 455 is connected by a wire 457 to the positive terminal of the hereinbefore-mentioned solenoid 150 (FIGS. 1B and 4). A branch wire 457a connects the wire 457 to the stationary contact 455 of the engineer's brake valve device 10, shown in FIG. 1C, and a wire 46a connects the stationary contact 454 of this brake valve device to the positive terminal of the battery 29.

The negative terminal of the solenoid 150 is connected by a wire 458 to the return wire 437 that is connected to the negative terminal of the battery 69 (FIG. 1A). Therefore, when the movable contact 452 of the brake valve device 10 shown in FIG. 1 is moved by the cam 451 into contact with the stationary contacts 454 and 455, a circuit is closed to effect energization of the solenoid 150. This circuit extends from the positive terminal of the battery 69 (FIG. 1A) via wires 68 and 456, stationary contact 454 (FIG. 2), movable contact 452, stationary contact 455, and wire 457 to the positive terminal of the solenoid 150, thence through the coil of the solenoid 150 to the negative terminal thereof, and via wires 458 and 437 to the negative terminal of the battery 69.

Upon energization of the solenoid 150 in the manner just described, the plunger 149 (FIG. 4) thereof will be moved downward to effect, through the intermediary of the fluted stem 148, unseating of the emergency valve 144 from the annular valve seat 145. Since the brake pipe 9 is connected to the chamber 142 via pipe T 416 (FIG. 1B), pipe 415, pipe T 414, pipe and passageway 110 (FIG. 4), past check valve 135, chamber 138, and passageway 109, fluid under pressure will now flow from the brake pipe 9 past the unseated emergency valve 144 and thence via bore 146, chamber 147, passageway and pipe 114, pipe T 422 (FIG. 1B), and pipe and passageway 421 to the chamber 77 of the pneumatic stick valve device 418. Fluid under pressure thus supplied to the chamber 77 is effective to deflect the diaphragm 75 downward to effect seating of the valve 87 and unseating of the valve 97 in the manner hereinbefore described for the cut-off valve device 12. Upon unseating of the valve 97, fluid at main reservoir pressure in the volume reservoir 7 flows therefrom via pipe and passageway 419, chambers 93 and 99, passageway and pipe 429, pipe T 430 having a choke open to atmosphere in its side outlet as hereinbefore stated, pipe 431, check valve device 432, and pipe and passageway 433 to the quick action chamber 212 (FIG. 3) of the brake control valve device 14.

Fluid at main reservoir pressure thus supplied to the quick action chamber 212 flows therefrom via passageway 211 to the chamber 210 below the diaphragm 208 of the emergency portion 206 of the brake control valve device 14 to increase the pressure in the chamber 210 so that the pressure therein exceeds brake pipe pressure present in the chamber 209 above the diaphragm 208. This establishes a differential of pressure that acts upward on the diaphragm 208 and is effective to deflect this diaphragm upward to, through the intermediary of stem 215, first unseat the brake pipe vent valve 214 to vent fluid under pressure from the brake pipe 9 via brake pipe branch pipe and passageway 15, chamber 209, past unseated valve 214, and port 216 to atmosphere at an emergency rate and then to move the cylindrical stem 426 upward to a position in which the peripheral annular groove 427 thereon establishes a communication between a passageway and pipe 459 that is connected to the auxiliary reservoir 3 and the passageway and pipe 423 that is connected via the pipe T 422 (FIG. 1B) and pipe 421 to the diaphragm chamber 77 of the pneumatic stick valve device 418. Therefore, fluid under pressure will flow from the auxiliary reservoir 3 to the chamber 77 of the pneumatic stick valve device 418 to maintain the valves 87 and 97 thereof, respectively, seated and unseated after the pressure in the brake pipe 9 has reduced to zero in response to the operation of the vent valve device 31 (FIG. 2) of the brake valve device 10 and the emergency portion 206 of the brake control valve device 14.

The brake control valve device 14 operates in response to the emergency rate of reduction of pressure in the brake pipe 9 in the manner described in Patent No. 3,018,138 to effect the supply of fluid under pressure from the auxiliary reservoir 3 to the passageway and pipe 226 and chamber 225 above diaphragm 218.

It may be noted that when the pressure in the brake pipe 9 is reduced to zero when making an emergency brake application, the pressure in the chamber 77 of the emergency valve device 323 is likewise reduced to zero, whereupon this valve device establishes a communication between the pipe and passageway 412 and passageway and pipe 417. Therefore, the fluid under pressure supplied to the pipe 226 by operation of the brake control valve device 14 flows via pipe T 227, pipe 228, double check valve device 25, pipe 409, pipe T 410, pipe 411, pipe cross 324, pipe and passageway 412, and pipe and passageway 417 to the chamber 296 of the fluid pressure operated relay valve device 24 in by-pass of the dynamic interlock valve device 26. Therefore, a full electro-pneumatic emergency brake application is effected irrespective of whether the dynamic brakes are applied or not.

The wire 457 is connected by a wire 460 (FIG. 1B) to a wire 461 that extends from end to end of the locomotive or self-propelled passenger car and is connected or coupled to a corresponding wire on an adjacent car, it being understood that each car in the train is provided with such a wire that is connected to each adjacent car and to the positive terminal of a solenoid on the respective car that corresponds to the solenoid 150. Furthermore, the negative terminal of these solenoids is connected to a wire that extends from car to car through the train and is connected to the wire 437a that extends from end to end of the locomotive or self-propelled passenger car from which the brakes are controlled. The wire 437a is connected as shown in FIG. 1B via wire 437 to the negative terminal of the battery 69. Therefore, the solenoid on each car in the train corresponding to the solenoid 150 on the locomotive or leading self-propelled car is energized simultaneously as the solenoid 150 is energized to cause the brake equipment on each car in the train to effect an electro-pneumatic emergency application of the brakes on that respective car.

After the train has been brought to a stop and the danger no longer exists, the brakes on the train may be released by the engineer moving the handle 361 of the brake valve 10, shown in FIG. 1, from its "Emergency" position in the direction of its "Release" position back to this position. When the handle 361 is thus returned to its "Release" position, the cam 451 (FIG. 2) is moved to a position to render spring 453 effective to move movable contact 452 out of contact with the stationary contacts 454 and 455 thereby opening the circuit of the solenoid 150 (FIGS. 1B and 4) and the corresponding solenoids on the other cars in the train. When the solenoid 150 and each corresponding solenoid is thus deenergized, the spring 143 and a spring corresponding to the spring 143 is rendered effective to respectively seat the emergency valve 144 and each valve corresponding to the emergency valve 144 on a corresponding valve seat to close communication between chambers 142 and 147 and the chambers corresponding to the chambers 142 and 147.

The brake valve device 10 operates in the manner hereinbefore described in connection with the release of an electro-pneumatic service brake application to effect charging of the brake pipe 9 and the chambers 60 and 61 of the master controller device 11. The brake control valve device 14 and the corresponding brake control valve device on each car in the train operate in response to charging of the brake pipe to release the brakes on the respective car, and the master controller device 11 operates in response to recharging of the chambers 60 and 61 to effect deenergization of the solenoids 182 and 202 and the corresponding solenoids on the other cars in the train.

*Conductor's valve emergency brake application*

As shown in FIG. 2 of the drawings, the vent valve device 31 of the engineer's brake valve device 10 comprises a piston valve 462 normally seated by a spring 463 on an annular valve seat 464. Main reservoir pressure which is supplied to the chamber 404 in the manner hereinbefore described flows from the chamber 404 via a passageway 465 to a chamber 466 at the right-hand side of the piston valve 462 and thence via a choke 467 in the piston valve to a chamber 468 at the left-hand side thereof. The chamber 468 is connected by a passageway and pipe 469 to a conventional conductor's valve device 470, one of which is shown in FIGS. 1 and 1C of the drawings, for each of the respective engineer's brake valve devices 10.

If, when the brakes on the train are released, the conductor desires to bring the train to a stop, he will operate a lever 471 of either conductor's valve device 470 to vent fluid under pressure from chamber 468 of the vent valve device 31 of the respective engineer's brake valve device 10 to atmosphere at a faster rate than it can flow through the choke 467 in the corresponding piston valve 462 whereupon the higher pressure in the chamber 466 will move the piston valve 462 in the direction of the left hand against the yielding resistance of the spring 463 and away from the corresponding valve seat 464. Fluid under pressure will now be vented from the brake pipe 9 to atmosphere at an emergency rate via pipe and passageway 402, past the unseated piston valve 462 and a passageway 472 in the sectionalized casing 27.

The brake control valve device 14 will now operate in response to this emergency rate of reduction of pressure in the brake pipe 9 in the manner described in Patent No. 3,018,138 to cause the supply of fluid under pressure to the fluid pressure operated relay valve device 24 in by-pass of the dynamic interlock valve device 26 as hereinbefore described to cause an automatic-pneumatic emergency application of the brakes on the locomotive or self-propelled passenger car that is the leading car in the train.

The emergency portion 206 of the brake control valve device 14 operates in the manner hereinbefore described to effect the supply of fluid under pressure from the auxiliary reservoir 3 to the diaphragm chamber 77 of the pneumatic stick valve device 418 to cause it to operate in the manner hereinbefore described. However, the emergency portion 206 of the brake control valve device 14 has already operated to effect unseating of the brake pipe vent valve 214 (FIG. 3). Therefore, the operation of the pneumatic stick valve device 418 is without effect.

The fluid under pressure supplied from the auxiliary reservoir 3 to the chamber 77 of the pneumatic stick valve device 418 also flows via the side outlet of pipe T 422 (FIG. 1B), pipe and passageway 114 (FIG. 4) and branch passageway 114a to the chamber 151 above the piston 152 of the pneumatic switch device 153. Fluid under pressure thus supplied to the chamber 151 is effective to move the piston 152, piston rod 160, and the rod 164 carried thereby downward against the yielding resistance of the spring 170 to bring the contact 165, yieldingly biased by the contact spring 167 against the nut 166 secured to the rod 164, into contact with the switch terminals 168 and 169 of the pneumatic switch device 153.

The switch terminal 168 is connected by a wire 473 to a wire 474 that extends from end to end of the locomotive or self-propelled passenger car and is connected or coupled to a corresponding wire on an adjacent car, it being understood that each car in the train is provided with such a wire that is connected to each adjacent car and to one terminal of a pneumatic switch device corresponding to the pneumatic switch device 153.

As shown in FIG. 1A, the wire 474 on the locomotive or self-propelled passenger car is connected by a wire 475 to one terminal of a switch device 476 that is manually closed by the engineer when he takes control of the locomotive or self-propelled passenger car to begin a run from one terminal to another. The other terminal of the switch device 476 is connected by a wire 477 to the positive terminal of the battery 69.

Therefore, when the contact 165 (FIG. 4) of the pneumatic switch device 153 is moved into contact with the switch terminals 168 and 169, a circuit is closed to effect energization of the solenoid 150. This circuit extends from the positive terminal of the battery 69 (FIG. 1A) via wire 477, switch device 476, wires 475, 474 and 473, switch terminal 168 (FIG. 4), contact 165, switch terminal 169, a wire 478 that connects switch terminal 169 to the wire 457, wire 457 to the positive terminal of the solenoid 150, thence through the coil of the solenoid 150 to the negative terminal thereof, wire 458 and return wire 437 to the negative terminal of the battery 29.

When the solenoid 150 is thus energized via the above-described circuit, it operates in the manner hereinbefore described, but this operation is without effect since the brake control valve device 14 has already operated to effect an automatic-pneumatic emergency brake application on the locomotive or self-propelled leading car in the train. However, since the wire 457 is connected to the wire 461 by the wire 460, the above-described operation of the pneumatic switch device 153 establishes a circuit for energizing the solenoids on the other cars in the train corresponding to the solenoid 150. This circuit extends from the positive terminal of the battery 69 via wire 477, switch device 476, wires 475, 474 and 473, switch terminal 168 (FIG. 4), contact 165, switch terminal 169, wires 478, 457 and wire 460 to the wire 461 that is connected to a corresponding wire on the adjacent car, which wire extends from car to car through the train, thence to the positive terminal of a solenoid on each car corresponding to the solenoid 150, through the coil of each respective solenoid to the negative terminal thereof, which terminal is connected to another wire that extends from car to car through the train and is connected to the wire 437a that, in turn, is connected via return wire 437 to the negative terminal of the battery 69.

Therefore, the solenoid on each car in the train corresponding to the solenoid 150 is energized through the circuit traced above and operates in the manner hereinbefore described for the solenoid 150 to cause an electro-pneumatic emergency application of the brakes on each respective car in the train to occur simultaneously and prior to operation of the brake control valve device on each respective car in response to the reduction in the pressure in the brake pipe at an emergency rate to effect an automatic-pneumatic emergency brake application.

After the train has been brought to a stop, the conductor will release the lever 471 of that one of the conductor's valve devices 470 previously actuated whereupon this conductor's valve device will operate to close communication between passageway and pipe 469 and atmosphere. Fluid under pressure from main reservoir 2 now supplied through the choke 467 (FIG. 2) to the chamber 468 will increase the pressure therein until the pressures in the chambers 466 and 468 are equalized whereupon the spring 463 will seat the piston valve 462 on annular valve seat 464 to close communication between passageway 402 and atmosphere. Fluid under pressure now supplied to the brake pipe 9 by the engineer's brake valve device 10 will flow via branch pipe 15 to the brake control valve device 14 to operate this brake control valve device to effect a release of the brakes on the locomotive or self-propelled passenger car that is the leading car in the train.

When the emergency portion 206 (FIG. 3) of the brake control valve device 14 is in its release position, the peripheral annular groove 427 on the cylinder stem 426 opens the passageway and pipe 432 to atmosphere via port 428. Therefore, fluid under pressure will be vented from chamber 151 (FIG. 4) of the pneumatic switch device 153 to atmosphere via branch passageway 114a, passageway and pipe 114, pipe T 422, pipe and passageway 423, peripheral annular groove 427 (FIG. 3) and port 428. As fluid under pressure is thus vented from the chamber 151, the spring 170 is rendered effective to return the piston 152, piston rod 160, rod 164 and contact 165 to the position shown in FIG. 4, in which position the contact 165 is out of contact with the switch terminals 168 and 169 to thereby open the hereinbefore-traced circuit to the solenoid 150 and corresponding solenoids on the other cars in the train.

When the solenoid 150 (FIG. 4) is thus deenergized, the spring 143 is rendered effective to seat the emergency valve 144 on the seat 145 so that fluid under pressure supplied from the brake pipe 9 to the chamber 142 will be retained therein. The solenoids on the other cars in the train corresponding to the solenoid 150 operate in the same manner as the solenoid 150. Likewise, the brake control valves on the other cars operate in response to charging of the brake pipe 9 to release the brakes on these cars.

*Automatic-pneumatic service brake application upon failure of an electro-pneumatic service brake application to materialize either upon initiation or thereafter*

Let it be supposed that the engineer has moved the handle of the propulsion controller to a position to effect cut-off of propulsion power to the driving motors of the diesel-electric locomotive or self-propelled passenger car and to set up dynamic brake circuitry as a result of which the lockout magnet valve device 317 (FIG. 1C) is energized to effect unseating of valve 330 and seating of valve 331.

Let it be further supposed that the engineer has moved the handle 361 of the engineer's brake valve device 10, shown in FIG. 1 of the drawings, arcuately from its "Release" position into the application zone an extent corresponding to the degree of srvice application desired.

Now let it be supposed that due to a broken wire or some other defect in the circuit to the solenoid 182 (FIG. 4), this solenoid is not energized to effect unseating of the service valve 176. Consequently, no fluid under pressure will flow from the control reservoir 4 and chamber 219 (FIG. 3) below the diaphragm 217 of the brake control valve device 14 via the dynamic interlock valve device 26 to chamber 296 of the fluid pressure operated relay valve device 24 to cause this relay valve device to operate to effect the supply of fluid under pressure to the brake cylinder device 1 to cause a limited electro-pneumatic service brake application.

Since the handle 361 of the engineer's brake valve device 10 shown in FIG. 1 has been moved to a position in the application zone corresponding to the degree of service application desired, the relay valve device 28 of this brake valve device operates in the manner described in Patent No. 2,958,561 to effect a corresponding reduction in the pressure in the brake pipe 9 and the chamber 222 (FIG. 3) above the diaphragm 217, which chamber 222 is connected to the brake pipe 9 via passageway and pipe 15. As the pressure in the chamber 222 is thus reduced, the control reservoir pressure present in the chamber 219, which is not being reduced at this time due to the defect in the circuit of the solenoid 182, is effective to deflect the diaphragm 217 upward to operate the service portion 207 of the brake control valve device 14 in the manner described in Patent No. 3,018,138 to effect the supply of fluid under pressure from the auxiliary reservoir 3 via the dynamic interlock valve device 26 to the fluid pressure operated relay valve device 24 to cause this relay valve device to operate in the manner hereinbefore described to effect a limited automatic-pneumatic brake application on the locomotive or self-propelled passenger car that is the leading car in the train until the dynamic brake fades out after which a full service automatic-pneumatic brake application is effected.

Therefore, upon failure of the solenoid 182 (FIG. 4) to effect unseating of the service valve 176 to supply fluid under pressure from the control reservoir 4 to the fluid pressure operated relay valve device 24 to cause an electro-pneumatic brake application on the locomotive or self-propelled passenger car that is the leading car in a train, the brake control valve device 14 on the locomotive or self-propelled passenger car will operate automatically in response to the reduction in brake pipe pressure without the necessity of any act whatsoever on the part of the engineer to effect an automatic-pneumatic service brake application on the locomotive or self-propelled passenger car that is the leading car in the train.

It should be noted that if the defect in the circuit of the solenoid 182 is between the junction of the wires 438 and 438a and the junction of the wires 437 and 437a, the master controller device 11 will operate in the manner hereinbefore described to effect an electro-magnetic service brake application on the trailing cars in the train substantially simultaneously as the brake control valve device 14 effects an automatic-pneumatic service brake application on the locomotive or self-propelled passenger car that is the leading car in the train. Therefore, a service brake application is effected on the entire train notwithstanding the defect in the circuit of the solenoid 182 on the locomotive or self-propelled passenger car that is the leading car in the train.

Furthermore, it should be noted that if the defect in the circuit of the solenoid 182 is between the positive terminal of the battery 69 and the junction of the wires 438 and 438a, or between the negative terminal of the battery 29 and the junction of the wires 437 and 437a, not only will the solenoid 182 on the locomotive or self-propelled passenger car that is the leading car in the train be rendered inoperative by the master controller device 11 but also the corresponding solenoid on each trailing car in the train. Therefore, an electro-pneumatic service brake application will not be obtained on the locomotive or self-propelled passenger car that is the leading car in the train or on any trailing car in the train. However, the reduction in brake pipe pressure effected by the engineer moving the handle 361 of the engineer's brake valve device 10 from its "Release" position to a position in its application zone corresponding to the degree of service application desired is effective to cause the brake control valve device on each trailing car in the train corresponding to the brake control valve device 14 on the locomotive or leading car to effect an automatic-pneumatic service brake application on each respective trailing car substantially simultaneously as the brake control valve device 14 effects an automatic-pneumatic service brake application on the locomotive or leading car so that an automatic-pneumatic service brake application is obtained on the entire train.

Now let it be supposed that the circuit to the solenoid 182 on the locomotive or leading car in the train and to the corresponding solenoids on the trailing cars in the train is intact, and that the circuit to the solenoid 202 (FIG. 4) is defective due to a broken wire or some other cause. Therefore, when the engineer moves the handle 361 of the engineer's brake valve device 10, shown in FIG. 1, arcuately from its "Release" position into its application zone an extent corresponding to the degree of service brake application desired, the solenoid 182 and the corresponding solenoids on the trailing cars will be energized to respectively effect unseating of the service valve 176 on the leading car and the corresponding valves on the trailing cars in the train. However, due to the defect in the circuit to the solenoid 202 (FIG. 4), this solenoid will not be energized to effect unseating of the double-beat valve 192 from the upper annular valve seat 199 and seating of this valve on the lower annular valve seat 198.

Upon unseating of the service valve 176 (FIG. 4), fluid under pressure will flow from the control reservoir 4, which is connected to the chamber 174 as hereinbefore explained, past the unseated service valve 176 and thence via bore 178, chamber 179, and passageway 183 to the counterbore 184 to effect unseating of check valve 189. With the check valve 189 unseated, the fluid under pressure supplied from the control reservoir 4 to the passageway 183 and counterbore 184 flows past the unseated check valve 189 to chamber 188 and thence to atmosphere via choke 190, passageways 113 and 116, chamber 194, bore 193, chamber 191, passageway and pipe 115, pipe T 227 (FIG. 1B), and pipe and passageway 226 (FIG. 3) which is connected to the exhaust passageway 408 while the brake control valve device 14 is in its release position.

Fluid under pressure will thus be vented from the control reservoir 4 to atmosphere until the pressure in the control reservoir 4 and chamber 120 (FIG. 4) is reduced to the hereinbefore-mentioned chosen value whereupon the heavy spring 126 will deflect diaphragm 121 downward and effect seating of the cut-off valve 125 on its corresponding annular valve seat 129, it being understood that the strength of the spring 126 is such that upon seating of the cut-off valve 125, sufficient pressure will be retained in the control reservoir 4 to effect an automatic-pneumatic brake application.

Subsequent to seating of cut-off valve 125 (FIG. 4) on annular valve seat 129 to prevent a further reduction in the pressure in the control reservoir 4 and chamber 219 (FIG. 3) below the diaphragm 217 of the service portion 207 of the brake control valve device 14, brake pipe pressure present in the chamber 222 above the diaphragm 217 will continue to reduce since the handle 361 of the engineer's brake valve device 10, shown in FIG. 1, is still in a position in its application zone. Therefore, this reduction in pressure in the chamber 222 will render the now constant and higher control reservoir pressure present in the chamber 219 below the diaphragm 217 effective to deflect the diaphragm 217 upward to operate the service portion 207 of the brake control valve device 14 to effect an automatic-pneumatic service brake application on the locomotive or self-propelled passenger car that is the leading car in the train as the dynamic brake fades out.

It may be noted that if the defect in the circuit of the solenoid 202 is between the junction of the wires 436 and 436a and the junction of the wires 437 and 437a, the master controller device 11 will operate in the manner hereinbefore described to effect an electro-pneumatic service brake application on the trailing cars in the train substantially simultaneously as the brake control valve device 14 effects an automatic-pneumatic service brake application on the locomotive or self-propelled passenger car that is the leading car in the train. Therefore, a service brake application is effected on the entire train notwithstanding the defect in the circuit of the solenoid 202 on the locomotive or self-propelled passenger car that is the leading car in the train.

If the defect in the circuit of the solenoid 202 is between the positive terminal of the battery 69 and the junction of the wires 436 and 436a, or between the negative terminal of the battery 29 and the junction of the wires 437 and 437a, the solenoid 202 and also the corresponding solenoids on the trailing cars in the train will be rendered inoperative by the master controller device 11 so that an electro-pneumatic service brake application cannot be obtained on any and all cars in the train. However, the brake pipe reduction effected by the engineer moving the handle 361 to a position in its application zone corresponding to the degree of service application desired will cause an automatic-pneumatic service brake application on the entire train as the dynamic brake fades out since the brake control valve device on each car in the train will respond to this brake pipe reduction to effect a service brake application on the corresponding car.

In the event an electro-pneumatic service brake application fails to materialize due to a broken circuit or some other defect occurring subsequent to initiation of the electro-pneumatic application, an automatic-pneumatic service brake application will be obtained in substantially the same manner as has been described.

*Release of an automatic-pneumatic service brake application resulting from the failure of an electro-pneumatic service brake application to materialize*

To release an automatic-pneumatic service brake application on a train resulting from the failure of an electro-pneumatic service brake application to materialize either upon initiation or thereafter, the engineer will move the handle 361 of the engineer's brake valve device 10 shown in FIG. 1 of the drawings from the position it occupies in its application zone in the direction of its "Release" position back to this position. When the handle 361 is thus returned to its "Release" position, the brake pipe 9 will be recharged to the hereinbefore-mentioned preselected normal pressure.

The brake control valve device 14 on the locomotive or self-propelled passenger car that is the leading car in the train and the corresponding brake control valve device on each trailing car in the train will respond to the charging of the brake pipe 9 to effect a release of the brakes on the locomotive or self-propelled passenger car that is the leading car in the train and each respective car and recharging of the reservoirs associated with each respective brake control valve device.

When the handle 361 is returned to its "Release" position, the chambers 60 and 61 of the master controller device 11 will be recharged to the hereinbefore-mentioned preselected normal pressure in the manner hereinbefore described. Therefore, upon the repair of the defective circuit to the respective solenoid 182 or 202, an electro-pneumatic service brake application can again be obtained in the manner hereinbefore described.

*Automatic-pneumatic emergency brake application upon failure of an electro-pneumatic emergency brake application to materialize either upon initiation or thereafter*

Let it be supposed that the engineer has moved the handle of the propulsion controller to a position to effect cut-off of propulsion power to the driving motors of the diesel-electric locomotive or self-propelled passenger car and to set up dynamic brake circuitry as a result of which the lockout magnet valve device 317 (FIG. 1C) is energized to effect unseating of valve 330 and seating of valve 331.

Let it be further supposed that the engineer has moved the handle 361 of the brake valve device 10, shown in FIG. 1 of the drawings, arcuately from its "Release" position to its "Emergency" position whereupon this brake valve device 10 will operate in the manner hereinbefore described to effect a reduction in the pressure in the brake pipe 9 to zero at an emergency rate.

The emergency valve device 323 (FIG. 1C) operates in response to the emergency reduction in the pressure in the brake pipe 9 which is connected via pipe T 416, pipe 415, pipe T 414, and pipe and passageway 413 to the diaphragm chamber 77 of this emergency valve device to connect the pipe and passageway 412 to the passageway and pipe 417 in by-pass of the dynamic interlock valve device 26.

Movement of the handle 361 to its "Emergency" position shifts the movable contact 452 (FIG. 2) against the yielding resistance of spring 453 into contact with the stationary contacts 454 and 455 in the hereinbefore-traced circuit for the solenoid 150 (FIG. 4). However, let it now be supposed that due to a broken wire or some other defect in the circuit to the solenoid 150, this solenoid is not energized to effect unseating of the emergency valve 144 upon movement of the movable contact 452 (FIG. 2) into contact with the stationary contacts 454 and 455. Therefore, an electro-pneumatic emergency brake application as hereinbefore described will not be obtained.

However, since the handle 361 of the brake valve device 10 shown in FIG. 1 has been moved to its "Emergency" position to effect a reduction in the pressure in the brake pipe to zero at an emergency rate, the brake control valve device 14 on the locomotive or self-propelled passenger car that is the lead car in the train and the corresponding brake control valve device on each trailing car in the train will operate in response to the reduction in pressure in the brake pipe to zero at an emergency rate to respectively supply fluid under pressure to the fluid pressure operated relay valve device 24 via the emergency valve device 323 and in by-pass of the dynamic interlock valve device 26 on the locomotive or leading car and to the corresponding relay valve device on the trailing cars to effect a full automatic-pneumatic emergency brake application on the entire train.

This automatic-pneumatic emergency brake application on the train can be released by returning the handle 361 of the brake valve device 10 shown in FIG. 1 to its "Release" position to effect recharging of the brake pipe to the hereinbefore-mentioned preselected normal pressure whereupon the brake control valve device on the locomotive or leading car and on each trailing car operates in response to recharging of the brake pipe to effect a release of this automatic-pneumatic emergency brake application on the corresponding car.

Having now described the invention, what I claim as new and desire to secure by Letters Patent, is:

1. In a fluid pressure brake system, in combination:
   (a) a brake pipe charged to a certain normal pressure,
   (b) a control reservoir charged to said certain normal pressure,
   (c) an auxiliary reservoir charged to said certain normal pressure,
   (d) electro-pneumatic brake control means operative to effect the supply of fluid under pressure from said control reservoir to cause an electro-pneumatic brake application,
   (e) an automatic brake control valve means having a movable abutment subject opposingly to brake pipe pressure and control reservoir pressure and operative by said control reservoir pressure in response to a reduction in brake pipe pressure relative to control reservoir pressure to effect the supply of fluid under pressure from said auxiliary reservoir to cause an automatic brake application, said automatic brake control valve means being rendered inoperative in response to a simultaneous reduction in said control reservoir pressure and in the pressure in said brake pipe and operative to effect an automatic brake application only upon failure of said electro-pneumatic brake control means to effect a reduction of control reservoir pressure incidental to the supply of fluid under pressure from said control reservoir to cause an electro-pneumatic brake application, and
   (f) an engineer's brake valve device operative out of a normal position, in which it effects charging of said brake pipe and said control and auxiliary reservoirs, into an application zone wherein it simultaneously effects a reduction in the pressure in said brake pipe and operation of said electro-pneumatic brake control means.

2. In a fluid pressure brake system, in combination:
   (a) a brake pipe charged to a certain normal pressure,
   (b) a control reservoir charged to said certain normal pressure,
   (c) an auxiliary reservoir charged to said normal pressure,
   (d) a brake cylinder device for effecting an application of brakes,
   (e) electro-pneumatic brake control means operative to effect the supply of fluid under pressure from said control reservoir to cause said brake cylinder device to effect an electro-pneumatic brake application,
   (f) an automatic brake control valve means having a movable abutment subject opposingly to brake pipe pressure and control reservoir pressure and operated by said control reservoir pressure in response to a reduction in brake pipe pressure relative to control reservoir pressure to effect the supply of fluid under pressure from said auxiliary reservoir to cause said brake cylinder device to effect an automatic brake application, said automatic brake control valve means being rendered inoperative in response to a simultaneous reduction in said control reservoir-pressure and in the pressure in said brake pipe and operative to effect the supply of fluid under pressure from said auxiliary reservoir to cause said brake cylinder device to effect an automatic brake application only upon failure of said electro-pneumatic brake control means to effect a reduction of control reservoir pressure incidental to the supply of fluid under pressure from said control reservoir to cause said brake cylinder device to effect an electro-pneumatic brake application, and
   (g) an engineer's brake valve device operative out of a normal position, in which it effects charging of said brake pipe and said control and auxiliary reservoirs, into an application zone wherein it simultaneously effects a reduction in the pressure in said brake pipe and operation of said electro-pneumatic brake control means.

3. In a fluid pressure brake system, in combination:
   (a) a brake pipe charged to a certain normal pressure,
   (b) a control reservoir charged to said certain normal pressure,
   (c) an auxiliary reservoir charged to said certain normal pressure,
   (d) a brake cylinder device for effecting an application of brakes,
   (e) a relay valve device operative upon supply of fluid under pressure thereto for effecting the supply of fluid under pressure to said brake cylinder device,
   (f) an electro-pneumatic brake control means operative to effect the supply of fluid under pressure from said control reservoir to said relay valve device to cause an electro-pneumatic brake application,
   (g) an automatic brake control valve means having a movable abutment subject opposingly to the brake pipe pressure and control reservoir pressure and operative by said control reservoir pressure in response to a reduction in brake pipe pressure relative to control reservoir pressure to effect the supply of fluid under pressure from said auxiliary reservoir to said relay valve device to cause said relay valve device to supply fluid under pressure to said brake cylinder device to effect an automatic brake application, said automatic brake control valve means being rendered inoperative in response to a simultaneous reduction in said control reservoir pressure and in the pressure in said brake pipe and operative to effect an automatic brake application only upon failure of said electro-pneumatic brake control means to effect a reduction of control reservoir pressure incidental to the supply of fluid under pressure from said control reservoir to said relay valve device to cause said relay valve device to supply fluid under pressure to said brake cylinder device to effect an electro-pneumatic brake application, and
   (h) an engineer's brake valve device operated out of a normal position, in which it effects charging of said brake pipe and said control and auxiliary reservoirs, into an application zone wherein it simultaneously effects a reduction in the pressure in said brake pipe and operation of said electro-pneumatic brake control means.

4. In a train fluid pressure brake system, in combination:
   (a) an electrical circuit extending from the locomotive through the cars in the train for controlling a brake application on the locomotive and cars,
   (b) fluid pressure operated switch means on the locomotive for controlling said circuit,
   (c) a normally charged volume reservoir,
   (d) fluid pressure operated "stick" valve means for controlling the charging of said volume reservoir,
   (e) an auxiliary reservoir charged to a normal pressure,
   (f) a brake pipe charged to said normal pressure,
   (g) an automatic brake control valve device for controlling the application and release of the brakes on the locomotive and in the charging of said auxiliary reservoir in response to variations in pressure in said brake pipe and having means operable to effect a reduction in the pressure in said brake pipe at an emergency rate to cause an emergency brake application on the locomotive,
   (h) electro-pneumatic valve means for effecting the supply of fluid under pressure from said brake pipe to said fluid pressure operated switch means to effect operation thereof to close said electrical circuit and to said fluid pressure operated "stick" valve means to cause the operation thereof to effect the supply of fluid under pressure from said volume reservoir to said means of said brake control valve device thereby causing said means to vent said brake pipe at an emergency rate to effect an emergency brake application on the locomotive and cars and to supply fluid under pressure from said auxiliary reservoir to said fluid pressure operated switch means to maintain said fluid pressure operated switch means in its operated position notwithstanding the depletion of pressure in said brake pipe as a result of the reduction of pressure therein at an emergency rate, and (i) manually controlled means for controlling the operation of said electro-pneumatic valve means.

5. In a combined electro-pneumatic and automatic brake system, in combination:
  (a) a first electrical circiut extending from the locomotive through the cars in the train for controlling electro-pneumatic service brake applications on the locomotive and the cars,
  (b) a pneumatically-operated master controller device on the locomotive for controlling energization and deenergization of said first electrical circuit,
  (c) a second electrical circuit extending from the locomotive through the cars in the train for controlling electro-pneumatic emergency brake applications on the locomotive and cars,
  (d) a fluid pressure operated switch means on the locomotive for controlling energization and deenergization of said second electrical circuit,
  (e) a normally charged volume reservoir,
  (f) a fluid pressure operated "stick" valve means operable from a first position for effecting charging of said volume reservoir to a second position for cutting off said charging and effecting the supply of fluid under pressure from said volume reservoir,
  (g) a brake pipe charged to said normal pressure,
  (h) electro-pneumatic valve means for effecting the supply of fluid under pressure from said brake pipe to said fluid pressure operated switch means to effect operation thereof to close said electrical circuit and to said fluid pressure operated "stick" valve means to cause the operation thereof to effect the supply of fluid under pressure from said volume reservoir,
  (i) an auxiliary reservoir charged to said normal pressure,
  (j) an automatic brake control valve device on a locomotive operable in response to an increase in the pressure in said brake pipe to effect a release of an automatic brake application and charging of said auxiliary reservoir and in response to a decrease in the pressure in said brake pipe to effect the supply of fluid under pressure from said auxiliary reservoir to cause an automatic brake application on the locomotive,
  (k) said automatic brake control valve device having an emergency portion connected to said "stick" valve means and operable by fluid under pressure supplied from said volume reservoir by said "stick" valve means to simultaneously effect an emergency rate of reduction of pressure in said brake pipe to cause an emergency application of brakes on a locomotive and cars and to effect the supply of fluid under pressure from said auxiliary reservoir to said fluid pressure operated switch means to maintain said switch means in the position to effect energization of said electrical circuit subsequent to the reduction of pressure in the brake pipe to atmospheric pressure, and
  (l) a manually operable engineer's brake valve device for effecting variation in the pressure in said brake pipe and the supply of fluid under pressure to and the release of fluid under pressure from said pneumatically operated master controller device for effecting the operation thereof, said manually operable engineer's brake valve device having an electrical switch closed in an emergency position of the engineer's brake valve device for effecting the operation of said electro-pneumatic valve means.

6. In a combined electro-pneumatic and automatic brake system, in combination:
  (a) a brake pipe charged to a certain normal pressure,
  (b) a multi-position manually operative engineer's brake valve device for effecting variations in the pressure in said brake pipe and having a switch device closed in one position of said brake valve device,
  (c) an electrical circuit extending from the locomotive through the cars in the train for controlling electro-pneumatic emergency brake applications on the train,
  (d) a fluid pressure operated switch device operable upon the supply of fluid under pressure thereto for effecting energization of said electrical circuit,
  (e) a volume reservoir charged to a certain pressure higher than said normal pressure,
  (f) a fluid pressure operated "stick" valve means operable from a first position for effecting charging of said volume reservoir to a second position for cutting off said charging and effecting the supply of fluid under pressure from said volume reservoir,
  (g) a magnet valve device energized in response to closing of the switch device of said engineer's brake valve device and operative when energized to effect the supply of fluid under pressure from said brake pipe to said fluid pressure operated switch device and to said fluid pressure operated "stick" valve means,
  (h) a control reservoir charged to said certain normal pressure,
  (i) an auxiliary reservoir charged to said certain normal pressure, and
  (j) an automatic brake control valve device having a movable abutment subject opposingly to brake pipe pressure and control reservoir pressure and operated by said control reservoir pressure in response to a reduction in brake pipe pressure relative to said control reservoir pressure to effect the supply of fluid under pressure from said auxiliary reservoir to cause an automatic brake application, said automatic brake control valve device having an emergency portion comprising:
    (i) a quick action chamber charged to said certain normal pressure and connected to said fluid pressure operated "stick" valve means so as to be supplied with said certain high pressure from said volume reservoir upon operation of said fluid pressure operated "stick" valve means by said magnet valve device,
    (ii) a movable abutment subject opposingly to brake pipe pressure and the pressure in said quick action chamber, and
    (iii) valve means operable by said movable abutment upon supply of said certain high pressure to said quick action chamber by said fluid pressure operated "stick" valve means to effect the venting of fluid under pressure from said brake pipe at an emergency rate to cause an automatic emergency brake application and to effect the supply of fluid under pressure from said auxiliary reservoir to said fluid pressure operated switch device to maintain said fluid pressure operated switch device in the position for effecting energization of said electrical circuit subsequent to the depletion of pressure in said brake pipe in response to the venting of fluid under pressure therefrom at an emergency rate by operation of said valve means to insure that said electro-pneumatic emergency brake application is maintained in effect.

7. A fluid pressure brake system as claimed in claim 3, further characterized in that said electro-pneumatic brake control means comprises:
 (a) an application wire,
 (b) a release wire,
 (c) a return wire,
 (d) a service magnet valve device connected to said application and return wires and operative when energized to effect the supply of fluid under pressure from said control reservoir to said relay valve device,
 (e) a release magnet valve device connected to said release and return wires and operative when energized to close communication between said relay valve device and atmosphere, and
 (f) a pneumatically operated master controller device controlled by operation of said engineer's brake valve device to control the supply of electrical power to said application wire and to said release wire.

8. A fluid pressure brake system as claimed in claim 3, further characterized by a double check valve device operable by fluid under pressure supplied by the automatic brake control valve means to one position to establish a communication between said automatic brake control valve means and said relay valve device and operable by fluid under pressure supplied by the electro-pneumatic brake control means to another position to establish a communication between said electro-pneumatic brake control means and said relay valve device.

9. A fluid pressure brake system as claimed in claim 1, further characterized in that the release of fluid under pressure for releasing an electro-pneumatically effected brake application is via a communication under the control of said automatic brake control valve means so that the electro-pneumatic brake application release can only be effected while said automatic brake control means is in its brake release position.

10. In a fluid pressure brake system, in combination:
 (a) a source of fluid under pressure,
 (b) a brake cylinder device for effecting an application of brakes,
 (c) a relay valve device operative upon supply of fluid under pressure thereto for effecting the supply of fluid under pressure from said source to said brake cylinder device,
 (d) a brake pipe charged to a certain normal pressure,
 (e) an auxiliary reservoir charged to said certain normal pressure,
 (f) a control reservoir charged to a said certain normal pressure,
 (g) electro-pneumatic brake control means operative to effect the supply of fluid under pressure from said control reservoir to said relay valve device to cause an electro-pneumatic brake application,
 (h) a fluid pressure operated master controller device for controlling the operation of said electro-pneumatic brake control means,
 (i) automatic brake control valve means having a movable abutment subject opposingly to brake pipe pressure and control reservoir pressure and operative by said control reservoir pressure in response to a reduction in brake pipe pressure relative to control reservoir pressure to effect the supply of fluid under pressure from said auxiliary reservoir to said relay valve device to cause an automatic brake application, said automatic brake control valve means being rendered inoperative in response to a simultaneous reduction in said control reservoir pressure and in the pressure in said brake pipe and operative to effect an automatic brake application only upon failure of said electro-pneumatic brake control means to effect a reduction of control reservoir pressure incidental to the supply of fluid under pressure from said control reservoir to cause an electro-pneumatic brake application, and
 (j) an engineer's brake valve device operative out of a normal position in which it effects charging of said brake pipe and said auxiliary and control reservoirs into an application zone wherein it simultaneously effects a reduction in the pressure in said brake pipe and the supply of fluid under pressure to said master controller device to cause operation of said electro-pneumatic brake control means to cause an electro-pneumatic brake application.

11. In a combined electro-pneumatic and automatic locomotive brake system for controlling brakes on the locomotive and on a train of cars coupled to said locomotive, in combination:
 (a) electrical circuitry for controlling electro-pneumatic service brake applications on the locomotive and on the cars connected thereto, said circuitry comprising:
  (i) an application wire extending from end to end of the locomotive and adapted to be coupled to a corresponding application wire on an adjacent car,
  (ii) a release wire extending from end to end of the locomotive and adapted to be coupled to a corresponding release wire on an adjacent car,
  (iii) a return wire extending from end to end of the locomotive and adapted to be coupled to a corresponding return wire on an adjacent car,
 (b) a source of electrical power,
 (c) a pneumatically-operated master controller device operable out of a normal position to a first position to effect the supply of electrical power to only said release wire, and to a second position to effect the supply of electrical power to both said release wire and said application wire,
 (d) a brake pipe charged to a normal pressure,
 (e) a control reservoir charged to said normal pressure,
 (f) an auxiliary reservoir charged to said normal pressure,
 (g) fluid pressure operated means for effecting a brake application on the locomotive,
 (h) a release magnet valve device having a solenoid connected to said release wire and said return wire and operable when energized in response to the supply of electrical power to said release wire by operation of said pneumatically-operated master controller device to its said first position to close a communication between said fluid pressure operated means and atmosphere,
 (i) an application magnet valve device having a solenoid connected to said application wire and said return wire and operable when energized in response to supply of electric power to said application wire by operation of said pneumatically-operated master controller device to its said second position to effect the supply of fluid under pressure from said control reservoir to said fluid pressure operated means to cause an electro-pneumatic brake application on the locomotive,
 (j) an automatic brake control valve device having a movable abutment subject opposingly to brake pipe pressure and control reservoir pressure and operable by said control reservoir pressure in response to a reduction in brake pipe pressure relative to control reservoir pressure to effect the supply of fluid under pressure from said auxiliary reservoir to said fluid pressure operated means to cause an automatic brake application on the locomotive, said automatic brake control valve device being rendered inoperative in response to a simultaneous reduction in said control reservoir pressure and in the pressure in said brake pipe and operative to effect an automatic brake application only upon failure of said electric circuitry to cause respectively energization of said release magnet valve device to close said communication and said application magnet valve device to effect a reduction of control reservoir pressure incidental to the supply of fluid under pressure from said control reservoir to cause an electro-pneumatic brake application, and (k) an engineer's brake valve device operative out of a normal position in which it effects the supply of fluid under pressure to said pneumatically-operated master controller device to effect movement thereof to its normal position and the supply of fluid under pressure to said brake pipe to effect charging thereof to a certain normal charged value, into an application zone wherein it simultaneously effects the release of fluid under pressure from said pneumatically-operated master controller device to cause sequential operation thereof to said first and said second positions and a reduction in the pressure in said brake pipe.

12. A combined electro-pneumatic and automatic locomotive brake system as claimed in claim 11, further characterized by additional electric circuitry for controlling emergency brake applications on the locomotive and cars connected thereto, said additional electrical circuitry comprising:

(a) a pair of wires extending from end to-end of the locomotive and adapted to be coupled to a corresponding pair of wires on an adjacent car,
(b) a source of electrical power,
(c) a fluid pressure operated switch means on the locomotive for controlling the supply of power to said pair of wires on the locomotive,
(d) electro-pneumatic valve means for effecting a supply of fluid under pressure from said brake pipe to said fluid pressure operated switch means to effect operation thereof to cause a supply of power to said pair of wires, and
(e) a switch device for controlling the operation of said electro-pneumatic valve means, said switch device being associated with said engineer's brake valve device and moved to a closed position only when said brake valve device is moved to its emergency position.

References Cited by the Examiner

FOREIGN PATENTS 1,105,904    5/1961    Germany.

EUGENE G. BOTZ, *Primary Examiner.*